United States Patent
Tuukkanen

(10) Patent No.: US 9,518,831 B2
(45) Date of Patent: Dec. 13, 2016

(54) METHOD AND APPARATUS FOR PROVIDING RELEVANT POINT OF INTEREST ON A MULTI-MODAL ROUTE

(71) Applicant: HERE Global B.V., Veldhoven (NL)

(72) Inventor: Marko Tapio Tuukkanen, Schlenzer (DE)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/588,517

(22) Filed: Jan. 2, 2015

(65) Prior Publication Data

US 2016/0195403 A1 Jul. 7, 2016

(51) Int. Cl.
| | | |
|---|---|---|
| G01C 21/00 | (2006.01) | |
| G01C 21/34 | (2006.01) | |
| G01C 21/20 | (2006.01) | |
| G01C 21/36 | (2006.01) | |

(52) U.S. Cl.
CPC ........... *G01C 21/3423* (2013.01); *G01C 21/20* (2013.01); *G01C 21/3679* (2013.01)

(58) Field of Classification Search
CPC ................................................. G01C 21/3423
USPC ........................ 701/400–541; 340/988–996
See application file for complete search history.

(56) References Cited

U.S. PATENT DOCUMENTS

| | | | |
|---|---|---|---|
| 7,693,652 B2* | 4/2010 | Cheung | G01C 21/3423 340/995.1 |
| 8,600,659 B1 | 12/2013 | Scherzinger | |
| 8,731,821 B2 | 5/2014 | Sheynblat | |
| 2006/0184314 A1* | 8/2006 | Couckuyt | G01C 21/3423 701/533 |
| 2007/0239348 A1* | 10/2007 | Cheung | G01C 21/3423 701/467 |
| 2009/0119001 A1* | 5/2009 | Moussaeiff | G01C 21/005 701/532 |
| 2010/0268449 A1 | 10/2010 | Feng | |
| 2010/0280853 A1 | 11/2010 | Petralia | |
| 2012/0004841 A1* | 1/2012 | Schunder | G01C 21/3423 701/412 |
| 2012/0109721 A1* | 5/2012 | Cebon | G06Q 30/06 705/13 |

(Continued)

FOREIGN PATENT DOCUMENTS

EP 1990789 A1 11/2008

OTHER PUBLICATIONS

Kyle L Schutt et al., "Project Proposal CS6604: Spatial Databases", Published on Apr. 14, 2014, pp. 1-6.

(Continued)

*Primary Examiner* — Muhammad Shafi
(74) *Attorney, Agent, or Firm* — Ditthavong & Steiner, P.C.

(57) ABSTRACT

An approach is provided for determining relevant point of interest for a user on a multi-modal route. The multi-modal route includes a plurality of segments that employ a plurality of modes of transport, and wherein the multi-modal route further includes a plurality of transition waypoints for transitioning between the plurality of segments. Then, one or more search results for the at least one search are determined. Subsequently, the one or more search results are a prioritized by determining at least one change in one or more locations of the plurality of transition waypoints that would result if the one or more search results were to be incorporated into the at least one multi-modal route.

20 Claims, 19 Drawing Sheets

(56) References Cited

U.S. PATENT DOCUMENTS

2013/0006515 A1  1/2013  Vellaikal et al.
2013/0218463 A1  8/2013  Howard et al.

OTHER PUBLICATIONS

Office Action for corresponding European Patent Application No. 15202461.8-1557, dated Jun. 23, 2016, 10 pages.

* cited by examiner

METHOD AND APPARATUS FOR PROVIDING RELEVANT POINT OF INTEREST ON A MULTI-MODAL ROUTE

BACKGROUND

Service providers and device manufacturers (e.g., wireless, cellular, etc.) are continually challenged to deliver value and convenience to consumers by, for example, providing compelling network services. One area of interest has been searching and presenting relevant Point-of-Interest (POI) for users along multi-modal routes. At present, service providers implement a boxed search method for searching POIs, this method neither acknowledges the real routing distance from a route to the POIs, nor considers the mode of transportation a user has available. Accordingly, service providers and device manufacturers face significant technical challenges in determining the appropriateness of a POI for each segment of a multi-modal route based, at least in part, on the location information, the temporal information, the modes of transportation, or a combination thereof.

Some Example Embodiments

Therefore, there is a need for an approach for determining relevant POI (e.g., POIs proximate to the current location of a user, POIs that can be reached the quickest, POIs that are highly rated and popular, etc.) for a user on a multi-modal route.

According to one embodiment, a method comprises receiving a request to perform at least one search for one or more points of interest along at least one multi-modal route, wherein the multi-modal route includes a plurality of segments that employ a plurality of modes of transport, and wherein the multi-modal route further includes a plurality of transition waypoints for transitioning between the plurality of segments. The method also comprises, determining one or more search results for the at least one search. The method also comprises causing, at least in part, a prioritization of the one or more search results by determining at least one change in one or more locations of the plurality of transition waypoints that would result if the one or more search results were to be incorporated into the at least one multi-modal route.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a reception of a request to perform at least one search for one or more points of interest along at least one multi-modal route, wherein the multi-modal route includes a plurality of segments that employ a plurality of modes of transport, and wherein the multi-modal route further includes a plurality of transition waypoints for transitioning between the plurality of segments. The apparatus is also caused to determine one or more search results for the at least one search. The apparatus is further caused to cause, at least in part, a prioritization of the one or more search results by determining at least one change in one or more locations of the plurality of transition waypoints that would result if the one or more search results were to be incorporated into the at least one multi-modal route.

According to another embodiment, a computer-readable storage medium carries one or more sequences of one or more instructions which, when executed by one or more processors, cause, at least in part, an apparatus to cause, at least in part, a receiving of a request to perform at least one search for one or more points of interest along at least one multi-modal route, wherein the multi-modal route includes a plurality of segments that employ a plurality of modes of transport, and wherein the multi-modal route further includes a plurality of transition waypoints for transitioning between the plurality of segments. The apparatus is further caused to determine one or more search results for the at least one search. The apparatus is also caused to cause, at least in part, a prioritization of the one or more search results by determining at least one change in one or more locations of the plurality of transition waypoints that would result if the one or more search results were to be incorporated into the at least one multi-modal route.

According to another embodiment, an apparatus comprises means for receiving a request to perform at least one search for one or more points of interest along at least one multi-modal route, wherein the multi-modal route includes a plurality of segments that employ a plurality of modes of transport, and wherein the multi-modal route further includes a plurality of transition waypoints for transitioning between the plurality of segments. The apparatus also comprises means for determining one or more search results for the at least one search. The apparatus further comprises means for causing, at least in part, a prioritization of the one or more search results by determining at least one change in one or more locations of the plurality of transition waypoints that would result if the one or more search results were to be incorporated into the at least one multi-modal route.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing prioritized locations of interest on a route are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
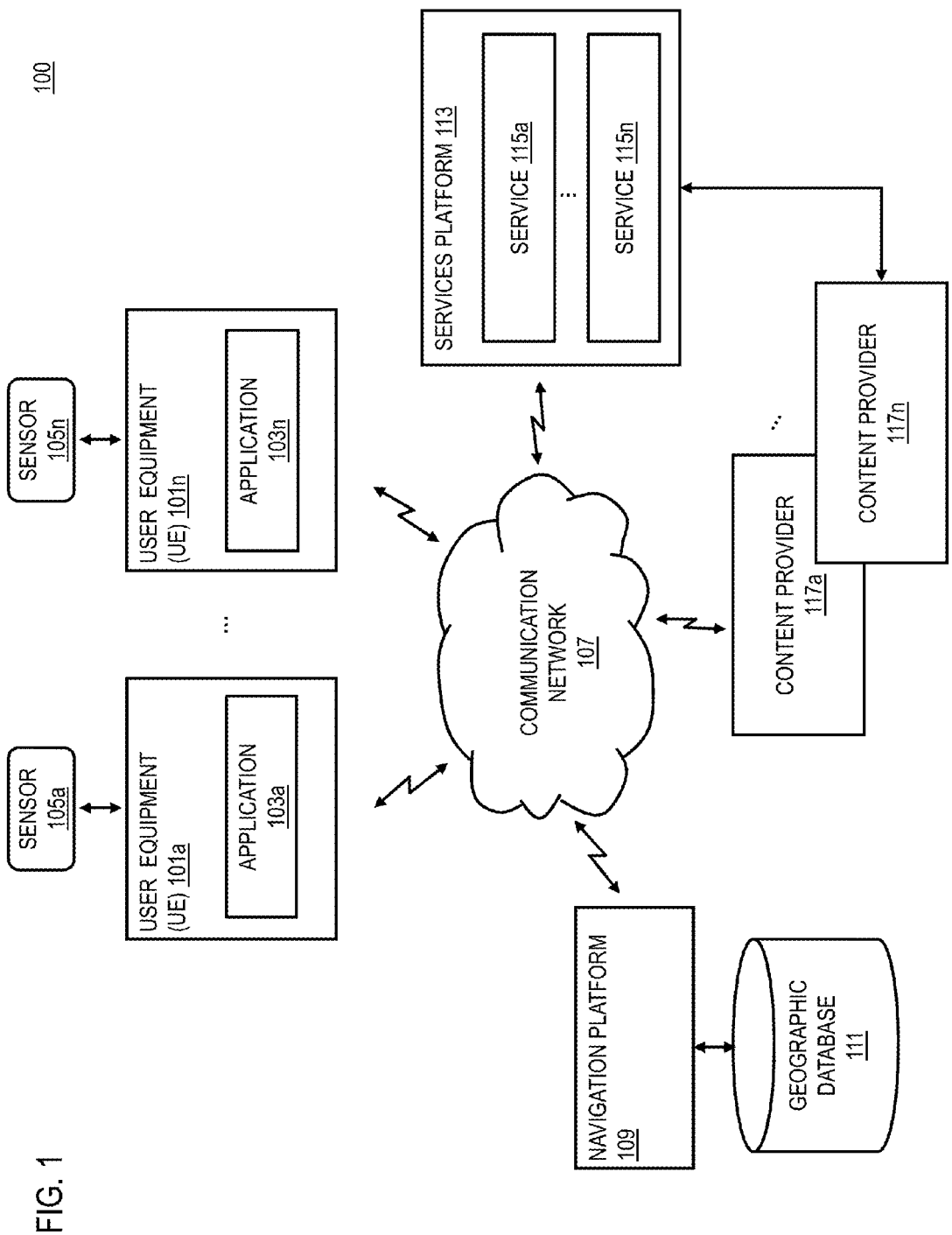
FIG. 1 is a diagram of a system capable of determining relevant point of interest for a user on a multi-modal route, according to one embodiment.

FIG. 1 is a diagram of a system capable of providing prioritized locations of interest on a route, according to one example embodiment. As noted previously, device users regularly rely on routing applications and corresponding services to access information regarding a travel route. By way of such tools, users may access maps for detailing the route, navigation directions, information regarding various streets (e.g., location anchors) they may encounter, Points-Of-Interests (POI) etc. Generally, the navigation routes are presented based on a present location and a destination for a user. The presented route may involve multiple modes of transport, for example, a pedestrian mode, a driving mode, a public transit mode, or a combination thereof. Further, the route may include multiple transition waypoints. For example, a waypoint may relate to a point on the route where the mode of transport may change from the pedestrian mode to the driving mode.

Typically, the locations of interest or POI are searched and presented for the navigation routes based on interest criteria provided by the device user. For example, the user may request for a fuel station on the route, accordingly the fuel stations on or near the route are presented to the user. The user may then transition at a waypoint on the route to visit the POI and then again join the route at a waypoint. However, as noted previously, such searches fail to provide a prioritized POI based on the transition waypoints of the multi-modal route.

To address this problem, a system 100 of FIG. 1 introduces the capability to provide prioritized POI on a route. In one embodiment, the multi-modal route may include one or more segments. For example, the segments on the route may be defined by one or more points such as cities or blocks on the route. Further, the modes of transport may be different for each of these segments. For example, one segment may be travelled in part on foot or in a pedestrian mode and other part in driving mode, while the next segment may be travelled completely by using a public transport. In addition, the system 100 may present one or more transition waypoints on the one or more segments. In one embodiment, the mode of transport may be changed at the one or more transition waypoints. In one embodiment, the one or more transition waypoints include, at least in part, one or more parking locations, one or more transit stops, or a combination thereof. In one scenario, a segment A-B may include transition waypoints W1 and W2, such that the user travels on foot from A to W1, then in a car from W1 to W2 and finally in a train from W2 to B.

As shown in FIG. 1, the system 100 comprises user equipment (UEs) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to the navigation platform 109 via the communication network 107.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the UE 101 may be included within the one or more vehicles.

By way of example, the applications 103 may be any type of application that is executable at the UE 101, such as, location-based services (e.g., providing proximity information), messaging applications (e.g., SMS, MMS, etc.), an Internet browser, media applications (e.g., music and/or video streaming, photo exchange, etc.), social networking applications, etc. In one embodiment, the UE 101 may use applications 103 to convey navigation services to one or more users. In another embodiment, the applications 103 may aid the navigation platform 109 in causing, at least in part, a presentation of multiple display of one or more map features which includes a map view and/or an information view based, at least in part, on a determination of an input for specifying one or more map features for at least one destination.

By way of example, the sensors 105 may be any type of sensor. In one embodiment, the sensors 105 may include one or more sensors that may assist the navigation platform 109 to determine route information for at least one destination. In one scenario, the sensors 105 may include location sensors (e.g., GPS), light sensors, oriental sensors augmented with height sensor and acceleration sensor, tilt sensors, tactile sensors, pressure sensors, audio sensors (e.g., microphone), or receivers for different short-range communications (e.g., Bluetooth, WiFi, etc.).

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the navigation platform 109 may be a platform with multiple interconnected components. The navigation platform 109 may include multiple servers, intelligent networking devices, computing devices, components and corresponding software for causing a presentation of multiple representation of one or more POI on one or more segments of routing information in one or more user interface elements of a user interface.

In one embodiment, the navigation platform 109 receives a request to perform at least one search for one or more POI along at least one multi-modal route. In one embodiment, the multi-modal route includes a plurality of segments that employ a plurality of modes of transport. Further, the multi-modal route includes a plurality of transition waypoints for transitioning between the plurality of segments. For example, the request may be received from a user of UE 101 and includes information or search criteria related to the POI, such as search for fuel stations along the route. In addition, the request may include information related to a starting point and a destination point. By way of example, the starting point information such as geographic coordinates may be detected by sensors 105 of the UE 101. In one embodiment, the navigation platform 109 may generate the multi-modal route, and determine the segments and the transition waypoints along the route. As noted previously, the transition waypoints include, at least in part, one or more parking locations, one or more transit stops, or a combination thereof.

In one embodiment, the navigation platform 109 determines one or more search results for the at least one search. For example, the search results may include POIs based on request received (e.g., search distance, search priority, etc.) from the UE 101. In one embodiment, the navigation platform 109 determines the search results by determining search priority information, search distance information, or a combination thereof independently for the plurality of segments based on the plurality of modes of transport used during a respective one of the plurality of segments. By way of example, if a user travels a segment on foot or a pedestrian mode, the search priority may be of a nearest POI (e.g., less than 1 KM), while on a segment with a driving mode a farther POI (e.g., less than 2 KM) is also searched. In one embodiment, the navigation platform 109 causes a recommendation of one or more new segments, one or more new modes of transport, or a combination thereof based, at least in part, on the one or more search results.

In one embodiment, the navigation platform 109 causes, at least in part, a prioritization of the one or more search results. The prioritization may be based on a determination of at least one change in one or more locations of the plurality of transition waypoints that would result if the one or more search results were to be incorporated into the at least one multi-modal route. By way of example, the prioritized search results may be presented to the user for more effective selection of a POI. In one scenario, the change in the locations of the waypoints may result if a particular search result (e.g., a point of interest) is selected by the user. In this case, the navigation platform 109 generates alternative waypoints based on the selections, and accordingly prioritizes the search results by effective selection by the user. For example, the search results that would result in minimum changes to the determined locations of the transition waypoints may be prioritized for selection by the user.

In one embodiment, the prioritization of the one or more search results is based on proximity information, type information, ratings information, user history information, or a combination thereof. Type information of the POI may include for example, an emergency location such as a hospital or a clinic, a shop such a convenience store, etc. Further, the user history may relate to for example, a frequent location or location type that the user visits on a route (e.g., the user may daily visit a convenience store while coming back to home from office). In one embodiment, the navigation platform 109 receives an input for specifying at least one target proximity, at least one target type, at least one target rating, at least one target user history, or a combination thereof. For example, a user may specify the target proximity as less than 1.5 KM from a current location. Similarly, the user may specify the target type, for example, as convenience store and/or target rating to highest. In one embodiment, the navigation platform 109 calculates change in the one or more locations of the plurality of transition waypoints based on selection of the one or more search results that meet the target proximity, at least one target type, at least one target rating, at least one target user history, or a combination thereof.

In one embodiment, the prioritization by the navigation platform 109 is based on determination of a reachability information for the one or more search results based on the change in the one or more locations of the transition waypoints. The reachability information may indicate a degree to which the one or more search results are reachable by a user using a respective one of the plurality of modes of transport. For example, a search result or a POI within 1 KM distance from a current location may have higher reachability and be prioritized if the pedestrian mode of transport is used for a segment.

In one embodiment, the navigation platform 109 receives an input for specifying a selection of the one or more search results. Consequently, the navigation platform 109 causes, at least in part, an incorporation of the selected one or more search results into the at least one multi-modal route by incorporating the at least one change in the one or more locations of the plurality of transition waypoints. In one embodiment, the navigation platform 109 causes, at least in part, a recommendation of one or more new segments, one or more new modes of transport, or a combination thereof based, at least in part, on the one or more search results. By way of example, the navigation platform 109 may cause change in the location of the transition waypoints to generate a modified route and modes of transport if the search results are selected by the user. One exemplary scenario is explained in conjunction with FIG. 7.

In one embodiment, the navigation platform 109 may include or have access to the geographic database 111 to access or store any kind of data associated with POI, such as historical user information, location proximity information, temporal information, contextual information, etc. Data stored in the geographic database 111 may, for instance, be provided by the UE 101, the services platform 113, one or more services 115a-115n (or services 115), or one or more content providers 117a-117n (or content providers 117).

The services platform 113 may include any type of service. By way of example, the services platform 113 may include mapping services, navigation services, travel planning services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the navigation platform 109 and the content providers 117 to supplement or aid in the processing of the content information. In other embodiments, the services platform 113, the services 115, the applications 103, etc. may be used to allow the users of UE 101 to cause a presentation of one or more segments of routing information, one or more modes of transport, one or more points of interests, one or more transition waypoints, in one or more user interface elements of a user interface.

By way of example, services 115 may be an online service that reflects interests and/or activities of users. In one scenario, the services 115 provide representations of each user (e.g., a profile), his/her social links, and a variety of additional information. The services 115 allow users to share location information, activities information, contextual information, and interests within their individual networks, and provides for data portability. The services 115 may additionally assist in providing the navigation platform 109 with travel information of the one or more geo-routes and/or location anchors, etc.

The content providers 117 may provide content to the UE 101, the navigation platform 109, and the services 115 of the services platform 113. The content provided may be any type of content, such as textual content, audio content, video content, image content, etc. In one embodiment, the content providers 117 may provide content that may supplement content of the applications 103, the sensors 105, or a combination thereof. By way of example, the content providers 117 may provide content that may aid in the processing of the content information associated with POI to determine route information. In one embodiment, the content providers 117 may also store content associated with the UE 101, the navigation platform 109, and the services 115 of the services platform 113. In another embodiment, the content providers 117 may manage access to a central repository of data, and offer a consistent, standard interface to data, such as a repository of users' navigational data content.

By way of example, the UE 101, the navigation platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
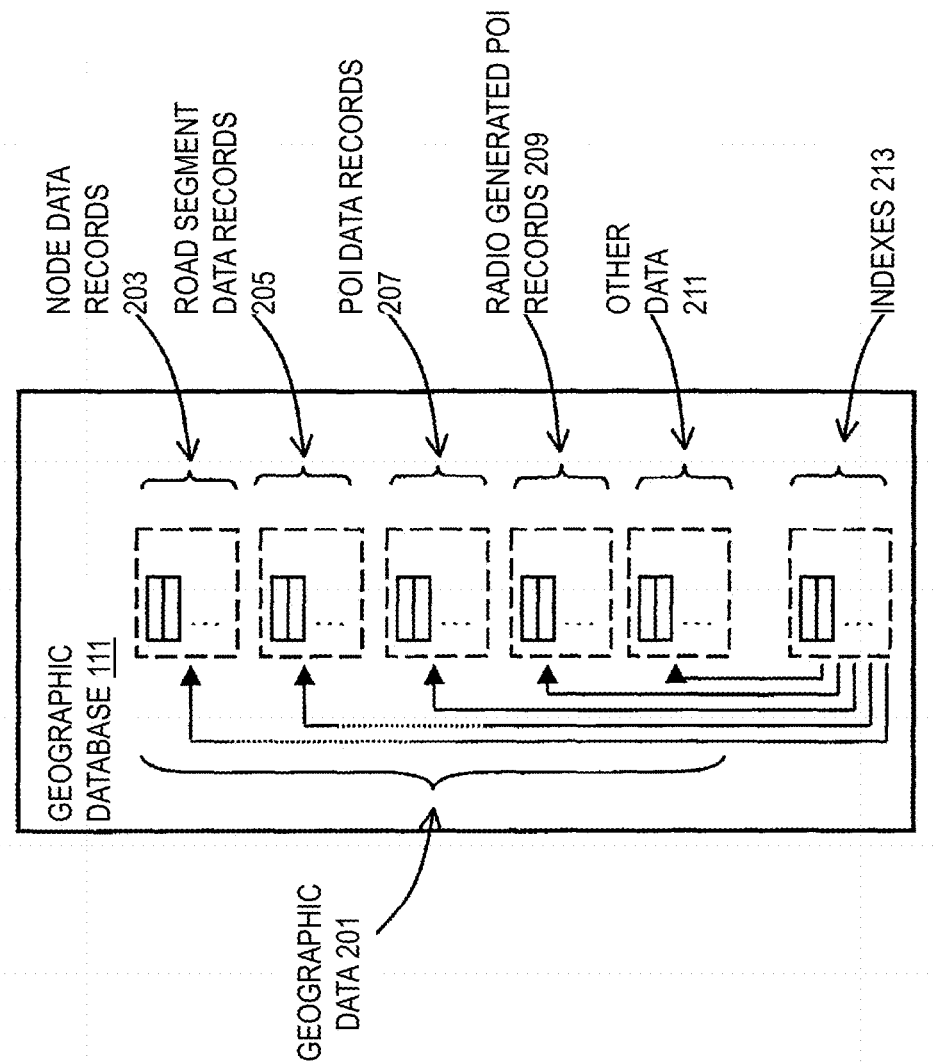
FIG. 2 is a diagram of the components of a geographic database 111, according to one embodiment.

FIG. 2 is a diagram of the geographic database 111 of system 100, according to exemplary embodiments. In the exemplary embodiments, POIs and map generated POIs data can be stored, associated with, and/or linked to the geographic database 111 or data thereof. In one embodiment, the geographic database 111 includes geographic data 201 used for (or configured to be compiled to be used for) mapping and/or navigation-related services, such as for personalized route determination, according to exemplary embodiments. For example, the geographic database 111 includes node data records 203, road segment or link data records 205, POI data records 207, radio generated POI records 209, and other data records 211, for example. More, fewer or different data records can be provided. In one embodiment, the other data records 211 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 205 are links or segments representing roads, streets, or paths, as can be used in the calculated route or recorded route information for determination of one or more personalized routes, according to exemplary embodiments. The node data records 203 are end points corresponding to the respective links or segments of the road segment data records 205. The road link data records 205 and the node data records 203 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 207. The geographic database 111 can also include data about places, such as cities, towns, or other communities, and other geographic features, such as bodies of water, mountain ranges, etc. Such place or feature data can be part of the POI data records 207 or can be associated with POIs or POI data records 207 (such as a data point used for displaying or representing a position of a city). In addition, the geographic database 111 can include data from radio advertisements associated with the POI data records 207 and their respective locations in the radio generated POI records 209. By way of example, a street is determined from the user interaction with the UE 101 and the content information associated with UE 101, according to the various embodiments described herein.

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UE 101) to provided navigation-related functions. For example, the geographic database 111 can be used with the end user device UE 101 to provide an end user with navigation features. In such a case, the geographic database 111 can be downloaded or stored on the end user device UE 101, such as in applications 103, or the end user device UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions such as guidance and map display, for example, and for determination of one or more personalized routes or route segments based on one or more calculated and recorded routes, according to exemplary embodiments.

Figure 3:
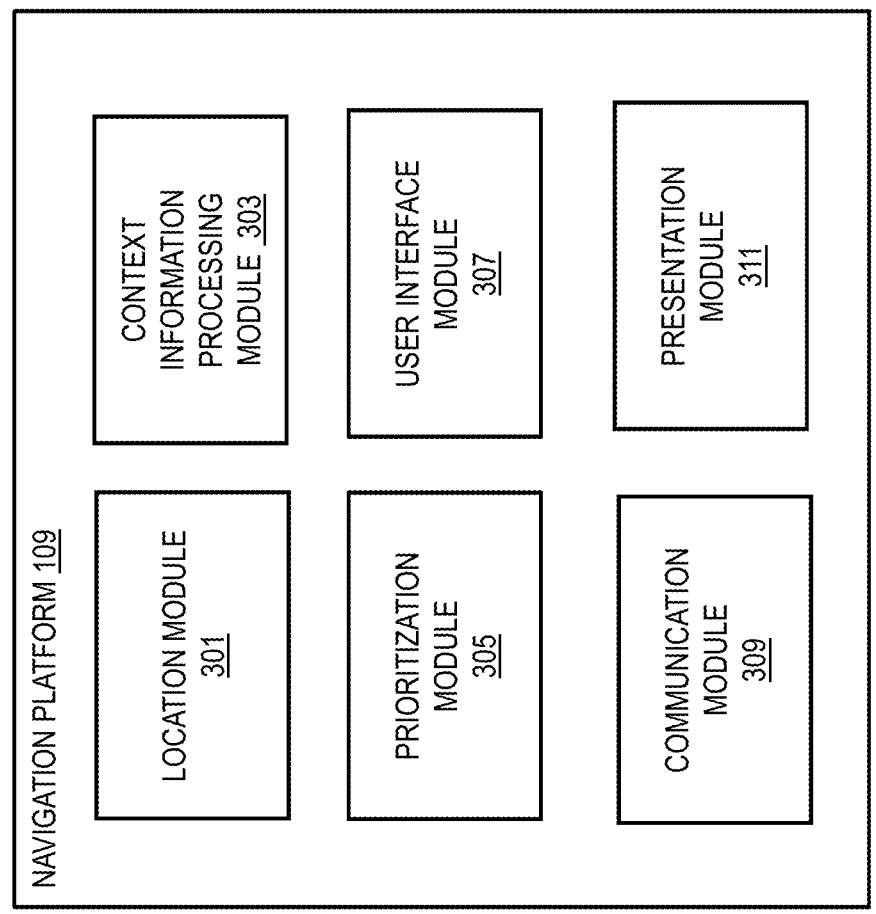
FIG. 3 is a diagram of the components of a navigation platform 109, according to one embodiment.

FIG. 3 is a diagram of the components of the navigation platform 109, according to one example embodiment. By way of example, the navigation platform 109 includes one or more components for providing prioritized one or more locations of interest on a route. It is contemplated that the functions of these components may be combined in one or more components or performed by other components of equivalent functionality. In this embodiment, the navigation platform 109 includes a location module 301, the context information processing module 303, the prioritization module 305, the user interface module 307, the communication module 309 and the presentation module 311.

In one embodiment, the location module 301 can determine the user's location. The user's location can be determined by a triangulation system such as GPS, assisted-GPS (A-GPS), Cell of Origin, or other location extrapolation technologies, as well as proximity location indicators, such as a signal from a wireless local area network (WLAN), a Bluetooth ® system, or the like. Standard GPS and A-GPS systems can use satellites to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 301 may also utilize multiple technologies to detect the location of the UE 101. For instance, a GPS system may narrow the location of the UE 101 to a building and a WLAN signal can determine UE 101 locations within the building. In one embodiment, the location module 301 aids the navigation platform 109 to determine a change in the location information, thereby causing a transition from one navigation segment to another navigation segment, and/or from one transition waypoint to another transition waypoint. In another embodiment, the location module 301 assists the navigation platform 109 in causing a notification to at least one user upon determination that the user has reached at least one destination.

In one embodiment, the context information processing module 303 receives context information as gathered by the sensors 105 of respective UE 101 and/or the geographic database 111 and/or services 115. Once received, the context information processing module 303 analyzes the context information to determine the relative location, time, position and other information useful for generating a map and/or route in association with a specified location and/or source and destination locations. Based on this determination, the context information processing module 303 triggers execution of the prioritization module 305, which facilitates the querying/retrieval of associated map and/or route image data from the geographic database 111 corresponding to the locations. In one embodiment, the context information processing module 303 processes and/or facilitates a processing of contextual information of at least one UE 101 thereby assisting the navigation platform 109 to cause a presentation of one or more points of interest, one or more waypoints, one or more modes of transport, based, at least in part, on the contextual information, the location information, the point of interest information or a combination thereof.

In one embodiment, the prioritization module 305 facilitates gathering of the various map and/or route images corresponding to the one or more search results via a mapping application or service. In addition, the prioritization module 305 determines and/or retrieves the various map and/or route images corresponding to a specified route. It is noted, in certain embodiments, that the prioritization module 305 may facilitate various image rendering, blending, merging and other compilation techniques for producing a user friendly map image.

In one embodiment, the user interface module 307 enables presentation of a graphical user interface for displaying map images in connection with a selected destination. By way of example, the user interface module 307 generates the user interface element in response to detection of an input for selection of a particular destination. As another example, the user interface module 307 enables colorful presentation and highlighting of points of interest related to the particular destination or the route presented via the user interface. Of note, the user interface module 307 triggers execution of the various other modules, including the location module 301, and the prioritization module 305 in response to user input. The user interface module 307 employs various application programming interfaces (APIs) or other function calls corresponding to the applications 103 of UE 101, thus enabling the display of graphics primitives such as menus, buttons, data entry fields, etc., for generating the user interface elements. Still further, the user interface module 307 may be configured to operate in connection with augmented reality (AR) processing techniques, wherein various different applications, graphic elements and features may interact. For example, the user interface module 307 may coordinate the presentation of augmented reality map images in conjunction with various images for a given location or in response to a selected destination. In one example embodiment, the at least one user interface element and/or the at least one second user interface may be a sub-window of the user interface element, wherein the at least one first representation of one or more prioritized search results of routing information may be updated based, at least in part, on the user interaction with the at least one second user interface element.

In one embodiment, the communication module 309 enables formation of a session over a communication network 107 between the navigation platform 109 and the services 115. By way of example, the communication module 309 executes various protocols and data sharing techniques for enabling collaborative execution between a UE 101 and the navigation platform 109 over the communication network 107.

The presentation module 311 makes a colored presentation of the map with determined routes, points of interest, and/or transition waypoints, and highlighted therein upon receiving the data from the communication module 309. The presentation module 311 may utilize the geographic database 111 and/or services 115 to determine whether the information for a route is up to date. This module obtains a set of summary statistics from other modules. Then, the module continues with generating a presentation corresponding to the destination. Subsequently, the module continues with providing a presentation of data set where the presentation could be depicted in one or more visual display units.

The above presented modules and components of the navigation platform 109 can be implemented in hardware, firmware, software, or a combination thereof. Though depicted as a separate entity in FIG. 1, it is contemplated that the navigation platform 109 may be implemented for direct operation by respective UE 101. As such, the navigation platform 109 may generate direct signal inputs by way of the operating system of the UE 101 for interacting with the applications 103. In another embodiment, one or more of the modules 301-311 may be implemented for operation by respective UEs, the navigation platform 109, or combination thereof. Still further, the navigation platform 109 may be integrated for direct operation with services 115, such as in the form of a widget or applet, in accordance with an information and/or subscriber sharing arrangement. The various executions presented herein contemplate any and all arrangements and models.

Figure 4:
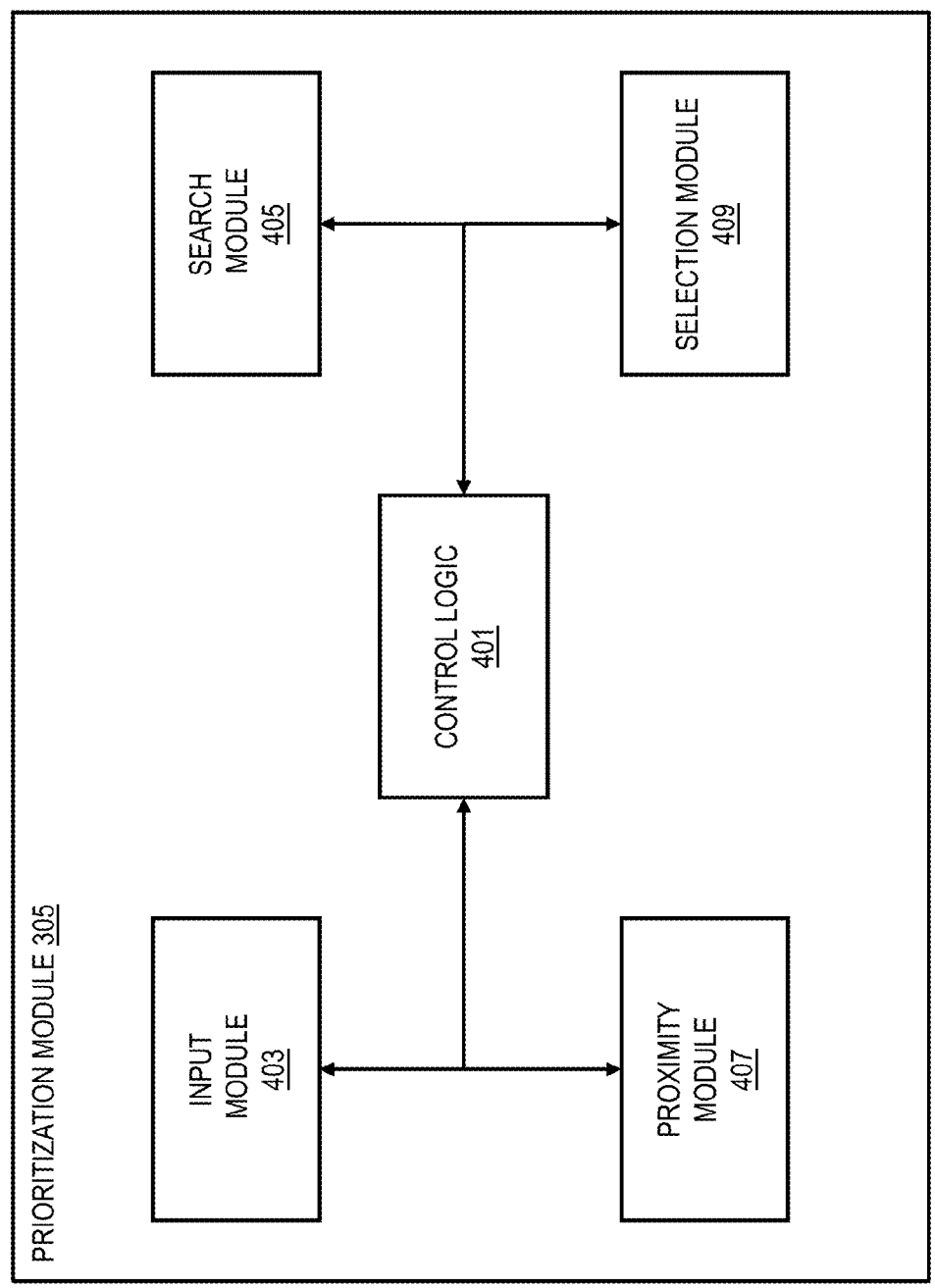
FIG. 4 is a diagram of the components of a prioritization module 305, according to one embodiment.

FIG. 4 is a diagram of the components of the prioritization module 305, according to one example embodiment. By way of example, the prioritization module 305 includes one or more components for searching one or more points of interest and causing prioritization of one or more search results. It is contemplated that the functions of these components may be combined in one or more components or performed by other components of equivalent functionality. In this embodiment, the prioritization module 305 includes a control logic 401, an input module 403, a search module 405, a proximity module 407, and a selection module 409.

The control logic 401 executes at least one algorithm for executing functions at the presentation module 311. For example, the control logic 401 may interact with the input module 403 to receive one or more requests to perform at least one search for one or more points of interest along at least one multi-modal route. Wherein the multi-modal route includes a plurality of segments that employ a plurality of modes of transport, and wherein the multi-modal route further includes a plurality of transition waypoints for transitioning between the plurality of segments.

Accordingly, the search module 405 determines the one or more search results. In one embodiment, the search results are determined based, at least in part, on priority information, distance information, or a combination thereof. The control logic 401 and the proximity module 407 may determine distance information of the UE 101 to the at least one segment and/or the transition waypoints. Further, the control logic 401 may relay the distance information to the location module 301 whereby the location module 301 may instruct the navigation platform 109 to cause a notification to the at least one user that he/she has reached at least one segment, a transition waypoint, or a POI of the route.

The control logic 401 and selection module 409 may prioritize the one or more search results from the search module 405. In one embodiment, the prioritization is based on determining at least one change in one or more locations of the plurality of transition waypoints that would result if the one or more search results were to be incorporated into the at least one multi-modal route. In one embodiment, the selection module 409 may determine the change in one or more locations of the transition waypoints. Further, the control logic 401 may relay the prioritization information to the presentation module 311 to present the prioritized search results along with the route information.

In one embodiment, the selection module 409 may determine a reachability information for the one or more search results based, at least in part, on the at least one change in the one or more locations of the plurality of transition waypoints. For example, the reachability information indicates a degree to which the one or more search results are reachable by a user by using a respective one of the plurality of modes of transport. Accordingly, the selection module 409 may prioritize the one or more search results based, at least in part, on the reachability information.

In one embodiment, the selection module 409 may cause, at least in part, a recommendation of one or more new segments, one or more new modes of transport, or a combination thereof based, at least in part, on the one or more search results. Further, the selection module 409 may cause, at least in part, a designation of a maximum range for at least one change in the one or more locations of the plurality of transition waypoints. For example, the maximum range of change in the location of a transition waypoint may be designated as 100 meters.

In one embodiment, the input module 403 may receive an input for specifying at least one target proximity, at least one target type, at least one target rating, at least one target user history, or a combination thereof. Accordingly, the selection module 409 causes a calculation of the at least one change in the one or more locations of the plurality of transition waypoints to select the one or more search results that meet the at least one target proximity, the at least one target type, the at least one target rating, the at least one target user history, or a combination thereof based, at least in part, on the proximity information, the type information, the ratings information, the user history information, or a combination thereof. As noted previously, for example, a user may specify the target proximity as less than 1.5 KM from a current location.

In one embodiment, the input module 403 may receive an input for specifying a selection of the one or more search results. For example, the user may select a certain POI from the presented search results. Accordingly, the selection module 409 causes, at least in part, an incorporation of the selected one or more search results into the at least one multi-modal route by incorporating the at least one change in the one or more locations of the plurality of transition waypoints.

In one embodiment, the selection module 409 may interact with other modules of the navigation platform 109 to direct the one or more UE 101 to the chosen route or POI. For example, the control logic 401 and applications 103 may work together to determine navigation guidance information to cause, at least in part, a presentation of the one or more route information. In one scenario, this may include UE 101 displaying directions on how to reach the POI and the mode of transport.

Figure 5:
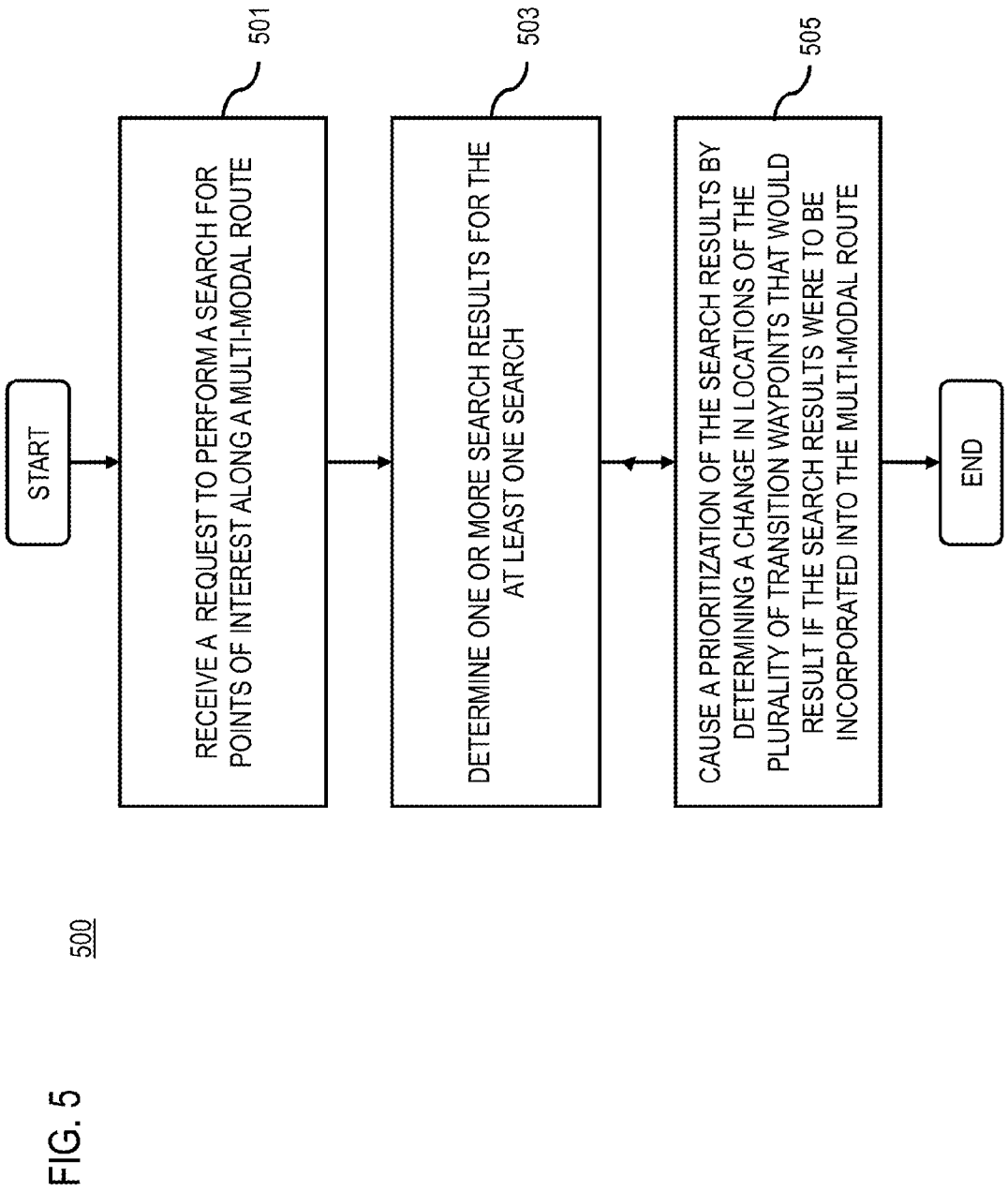
FIG. 5 is a flowchart of a process for providing prioritized POIs in a multi-modal route, according to one embodiment.
Figure 12:
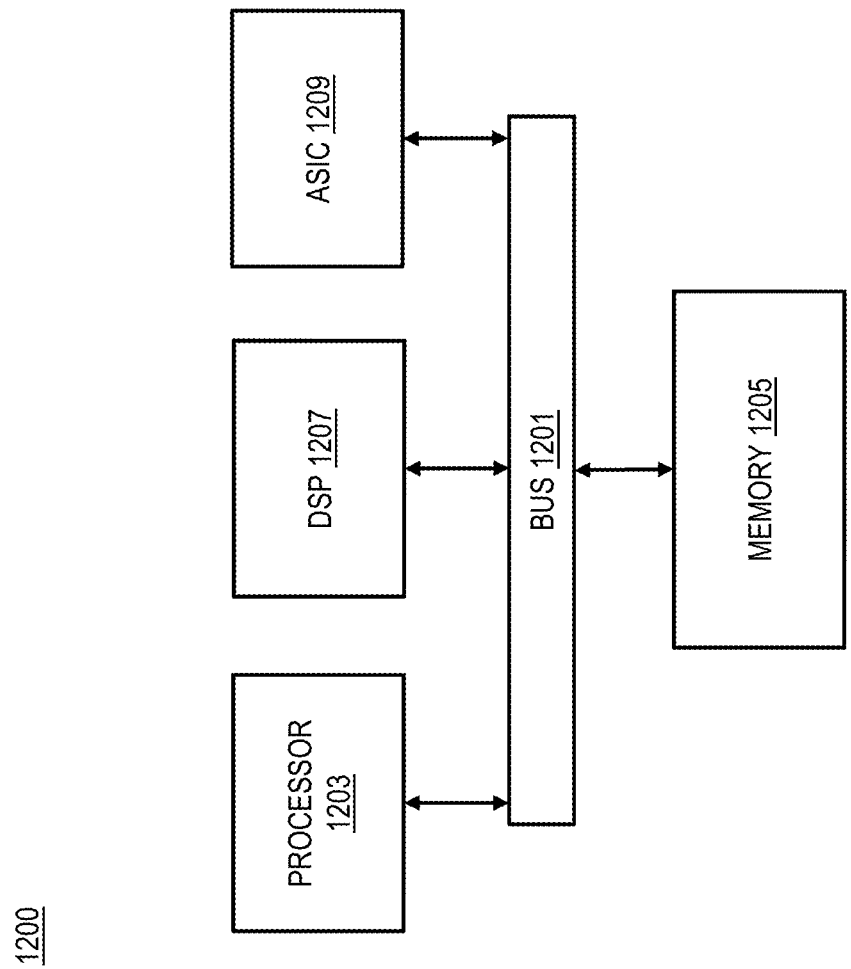
FIG. 12 is a diagram of a chip set that can be used to implement an embodiment of the invention.

FIG. 5 is a flowchart of a process for providing prioritized POIs in a multi-modal route, according to one embodiment. In one embodiment, the navigation platform 109 performs the process 500 and is implemented in, for instance, a chip set including a processor and a memory as shown in FIG. 12.

In step 501, the navigation platform 109 receives a request to perform at least one search for one or more points of interest along at least one multi-modal route. In one embodiment, the multi-modal route includes a plurality of segments that employ a plurality of modes of transport, and wherein the multi-modal route further includes a plurality of transition waypoints for transitioning between the plurality of segments. In one embodiment, a user may request for one or more points of interest along the multi-modal route. As noted previously, the one or more modes of transport include, at least in part, a pedestrian mode, a driving mode, a public transit mode, or a combination thereof. Further, as noted previously, the transition waypoints include, at least in part, one or more parking locations, one or more transit stops, or a combination thereof.

In step 503, the navigation platform 109 determines one or more search results for the at least one search. In one embodiment, the one or more search results are determined based, at least in part, on a search priority information, a search distance information, or a combination thereof. The navigation platform 109 determines the search priority information, the search distance information, or a combination thereof independently for the plurality of segments based, at least in part, on the plurality of modes of transport used during a respective one of the plurality of segments. By way of example, if the mode of travel for a segment on the route is public transit, then the search results (e.g., a diner) near the transit stops may be given priority over other search results.

In step 505, the navigation platform 109 causes, at least in part, a prioritization of the one or more search results. In one embodiment, the prioritization is based on a determination of at least one change in one or more locations of the plurality of transition waypoints that would result if the one or more search results were to be incorporated into the at least one multi-modal route. In one embodiment, the navigation platform 109 causes a designation of a maximum range for at least one change in the one or more locations of the plurality of transition waypoints. As noted previously, in one scenario, the change in the locations of the waypoints may result if a certain search result (e.g., a POI) is selected by the user. In this case, the navigation platform 109 generates alternative waypoints based on the selections, and accordingly prioritizes the search results by effective selection by the user. For example, the search results that would result in minimum changes to the determined locations of the transition waypoints may be prioritized for selection by the user. In one embodiment, the prioritization of the one or more search results is further based, at least in part, on proximity information, type information, ratings information, user history information, or a combination thereof.

Figure 6:
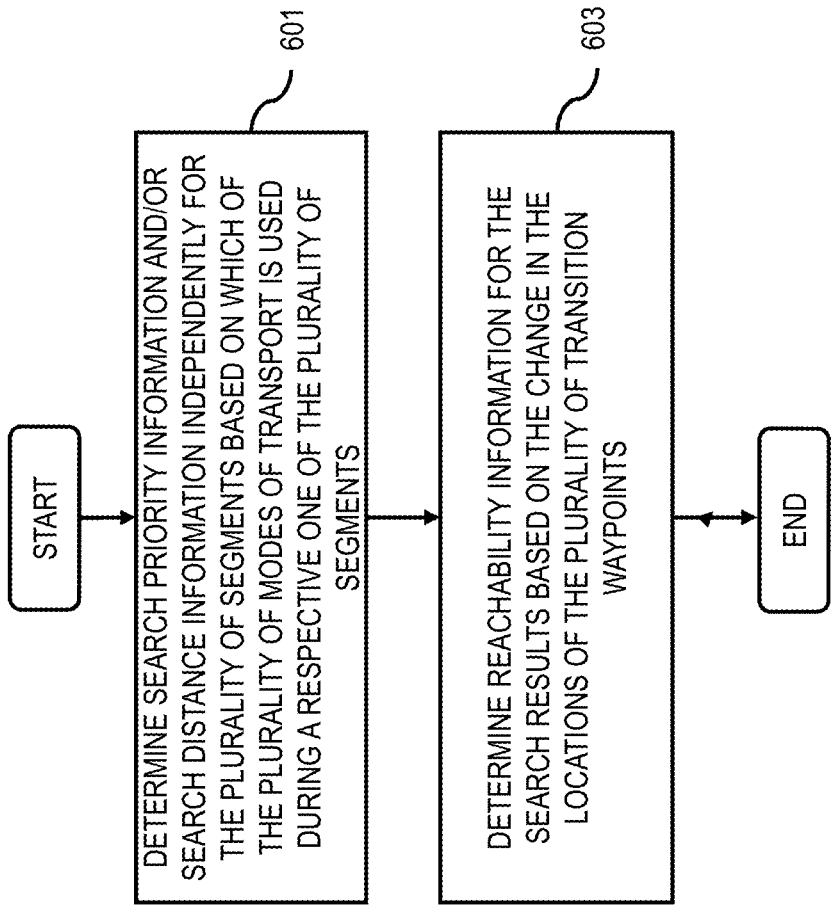
FIG. 6 is a flowchart of a process for determining search priority information and/or search distance information and/or reachability information for the plurality of segments, according to one embodiment.

FIG. 6 is a flowchart of a process for determining search priority information and/or search distance information and/or reachability information for the plurality of segments, according to one embodiment. In one embodiment, the navigation platform 109 performs the process 600 and is implemented in, for instance, a chip set including a processor and a memory as shown in FIG. 12.

In step 601, the navigation platform 109 determines search priority information, search distance information, or a combination thereof independently for the plurality of segments based, at least in part, on which of the plurality of modes of transport is used during a respective one of the plurality of segments. In one embodiment, the one or more search results are determined based, at least in part, on the search priority information, the search distance information, or a combination thereof.

In step 603, the navigation platform 109 determines reachability information for the one or more search results based, at least in part, on the at least one change in the one or more locations of the plurality of transition waypoints. In one embodiment, the reachability information indicates a degree to which the one or more search results are reachable by a user using a respective one of the plurality of modes of transport. In one embodiment, the prioritization of the one or more search results is further based, at least in part, on the reachability information. In one embodiment, the reachability information indicates a degree to which the one or more search results are reachable by a user using a respective one of the plurality of modes of transport. By way of example, a point of interest located at a distance of 2 KM may have lower reachability for a pedestrian mode as compared to the driving mode (i.e., by a car). The navigation platform 109 further prioritizes the one or more search results based on the reachability information. In one embodiment, the navigation platform 109 further causes, at least in part, a recommendation of one or more new segments, one or more new modes of transport, or a combination thereof based, at least in part, on the one or more search results.

Figure 7:
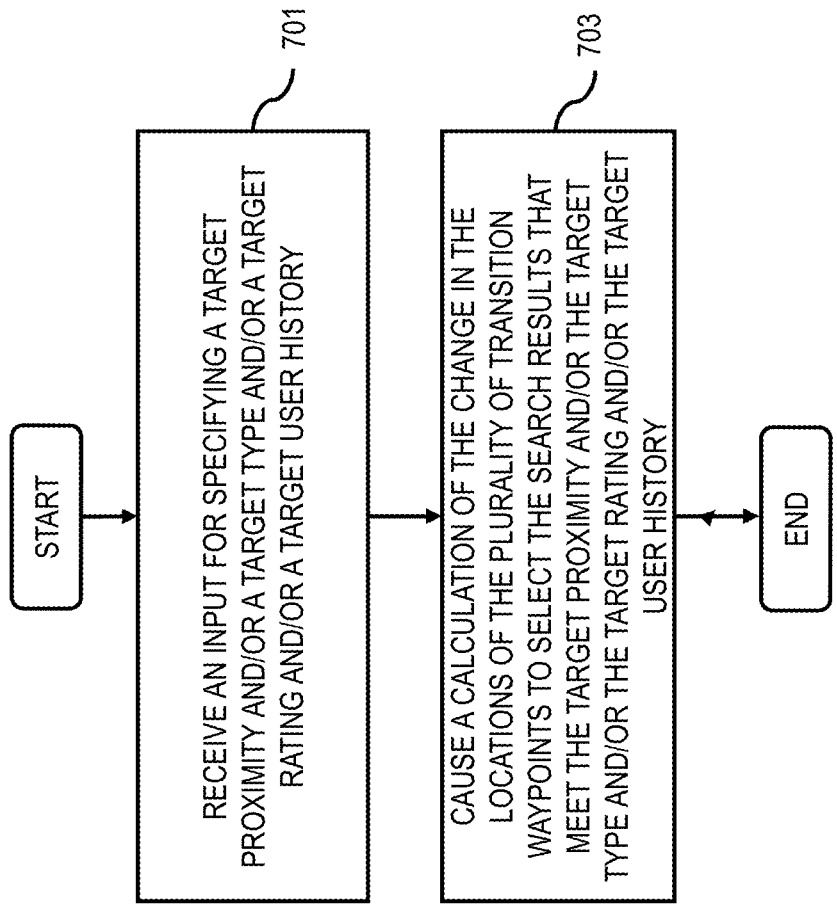
FIG. 7 is a flowchart of a process for selecting search results that meets target proximity and/or target type and/or target rating and/or target user history, according to one embodiment.

FIG. 7 is a flowchart of a process for selecting search results that meets target proximity and/or target type and/or target rating and/or target user history, according to one embodiment. In one embodiment, the navigation platform 109 performs the process 700 and is implemented in, for instance, a chip set including a processor and a memory as shown in FIG. 12.

In step 701, the navigation platform 109 receives an input for specifying at least one target proximity, at least one target type, at least one target rating, at least one target user history, or a combination thereof. For example, a user may specify the target proximity as less than 1.5 Kilometers from a current location, and the target rating as highest for a diner (i.e., a point of interest) on the multi-modal route.

In step 703, the navigation platform 109 causes, at least in part, a calculation of the at least one change in the one or more locations of the plurality of transition waypoints to select the one or more search results that meet the at least one target proximity, the at least one target type, the at least one target rating, the at least one target user history, or a combination thereof based, at least in part, on the proximity information, the type information, the ratings information, the user history information, or a combination thereof. In one example embodiment, the navigation platform 109 via sensors 105 determines that a user is between waypoints in a pedestrian mode. The navigation platform 109 may process content information for the user to determine user preferences, for example, the user prefers Chinese food and only eats at classy restaurants. Then, the navigation platform 109 may select highly rated Chinese restaurants that are within the distance of 1 Kilometer from the waypoints.

Figure 8:
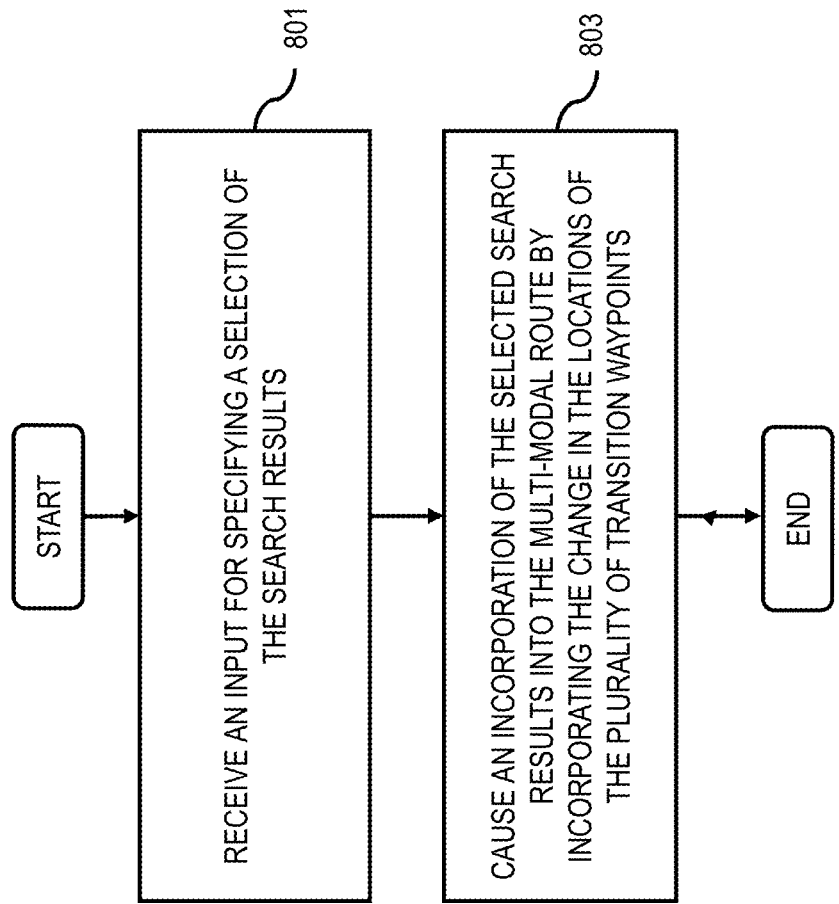
FIG. 8 is a flowchart of a process for incorporating the selected search results into the multi-modal route, according to one embodiment.

FIG. 8 is a flowchart of a process for incorporating the selected search results into the multi-modal route, according to one embodiment. In one embodiment, the navigation platform 109 performs the process 800 and is implemented in, for instance, a chip set including a processor and a memory as shown in FIG. 12.

In step 801, the navigation platform 109 receives an input for specifying a selection of the one or more search results. For example, the user may select one or more search results (i.e., POIs) for the route. In one embodiment, the user may select the search results from a user interface of the UE 101. In another embodiment, the one or more search results may be selected by the navigation platform 109 based on a target proximity, a target type, a target rating, a target user history, or a combination thereof.

In step 803, the navigation platform 109 causes, at least in part, an incorporation of the selected search results into the at least one multi-modal route by incorporating the at least one change in the one or more locations of the plurality of transition waypoints. In one example embodiment, the navigation platform 109 may cause a presentation of a route on the UE 101, which includes the selected search results and corresponding transition waypoints, segments and modes of transport. Then, the user may select one or more POIs from the search result. Subsequently, the navigation platform 109 incorporates the user selection into the multi-modal route to create a route that is convenient for the user.

Figure 9:
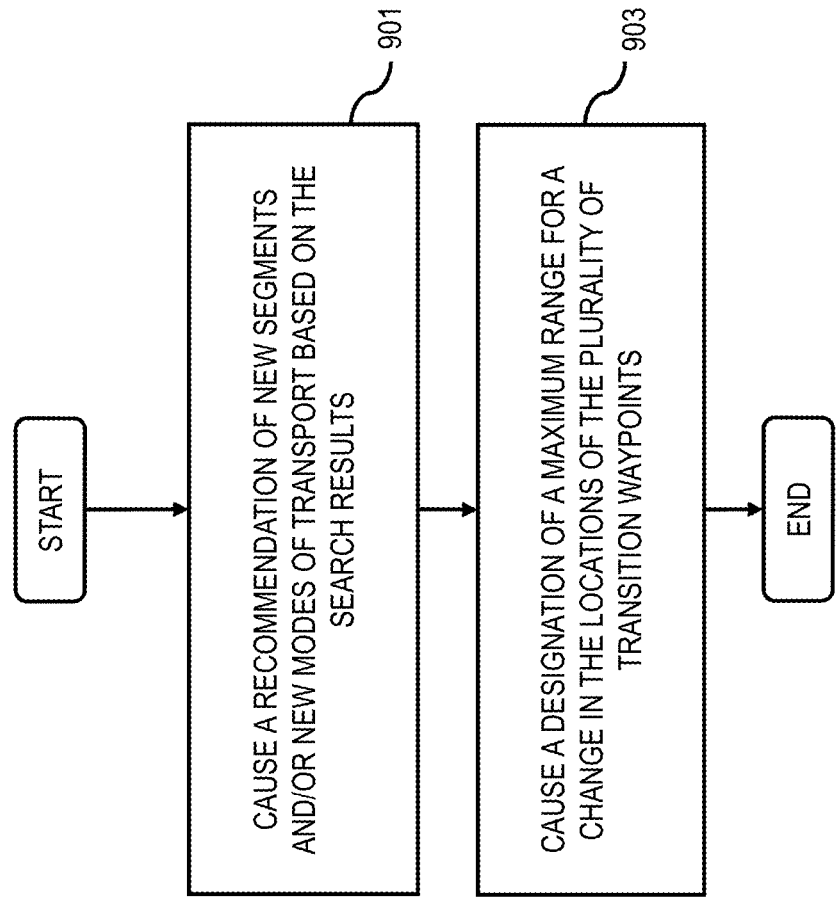
FIG. 9 is a flowchart of a process for recommending new segments and/or new modes of transport, and also designating a maximum range for a change in location of the plurality of transition waypoints, according to one embodiment.

FIG. 9 is a flowchart of a process for recommending new segments and/or new modes of transport, and also designating a maximum range for a change in location of the plurality of transition waypoints, according to one embodiment. In one embodiment, the navigation platform 109 performs the process 900 and is implemented in, for instance, a chip set including a processor and a memory as shown in FIG. 12.

In step 901, the navigation platform 109 causes, at least in part, a recommendation of one or more new segments, one or more new modes of transport, or a combination thereof based, at least in part, on the one or more search results.

In step 903, the navigation platform 109 causes, at least in part, a designation of a maximum range for at least one change in the one or more locations of the plurality of transition waypoints. In one scenario, the navigation platform 109 may designate the maximum range of 1 kilometer change in the location of a transition waypoint. In one example embodiment, the navigation platform 109 may search for restaurants within the range of 1 kilometer from the at least one waypoint.

FIGS. 10A-G are diagrams of user interfaces utilized in the processes of FIGS. 5-9, according to various embodiments. In one scenario, a user may want to travel from a starting point A to a destination point C, through an interim destination B. Accordingly, the segments A-B and B-C are displayed on the user interface 1001 of the UE 101. Further, the navigation platform 109 determines waypoints 1 and 2 on the segment A-B, and waypoints 3 and 4 on the segment B-C. In one embodiment, the navigation platform 109 determines the mode of transport from A to 1 as a pedestrian mode. The waypoint 1 and 2 may be for example, parking lots from where a connected car can be picked and left respectively. The mode of transport between the waypoint 1 and 2 may be a drive mode, and then a pedestrian mode from the waypoint 2 to the waypoint 3 via the interim destination B. In this scenario, the waypoint 3 may be a bus stop from where the user may take a public transport. The mode of transport between the waypoint 3 and 4 may therefore be a public transit mode, and subsequently the mode of transport between the waypoint 4 and the destination C may again be a pedestrian mode. The waypoint 4 may be a public transit point or a bus stop, in an exemplary scenario.

Figure 10A:
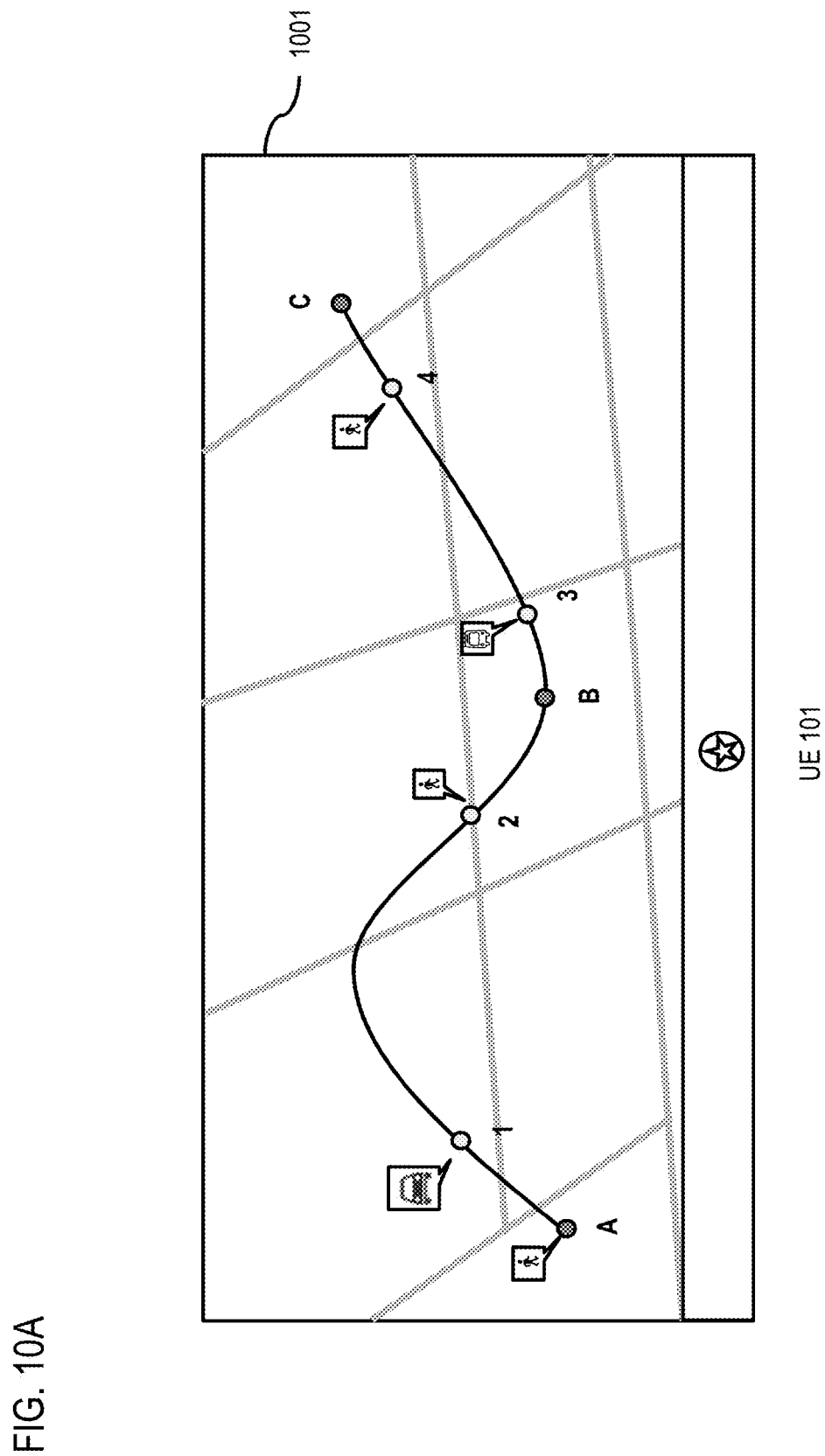
FIGS. 10A-G are user interface diagrams utilized in the processes of FIGS. 5-9, according to various embodiments.
Figure 10B:
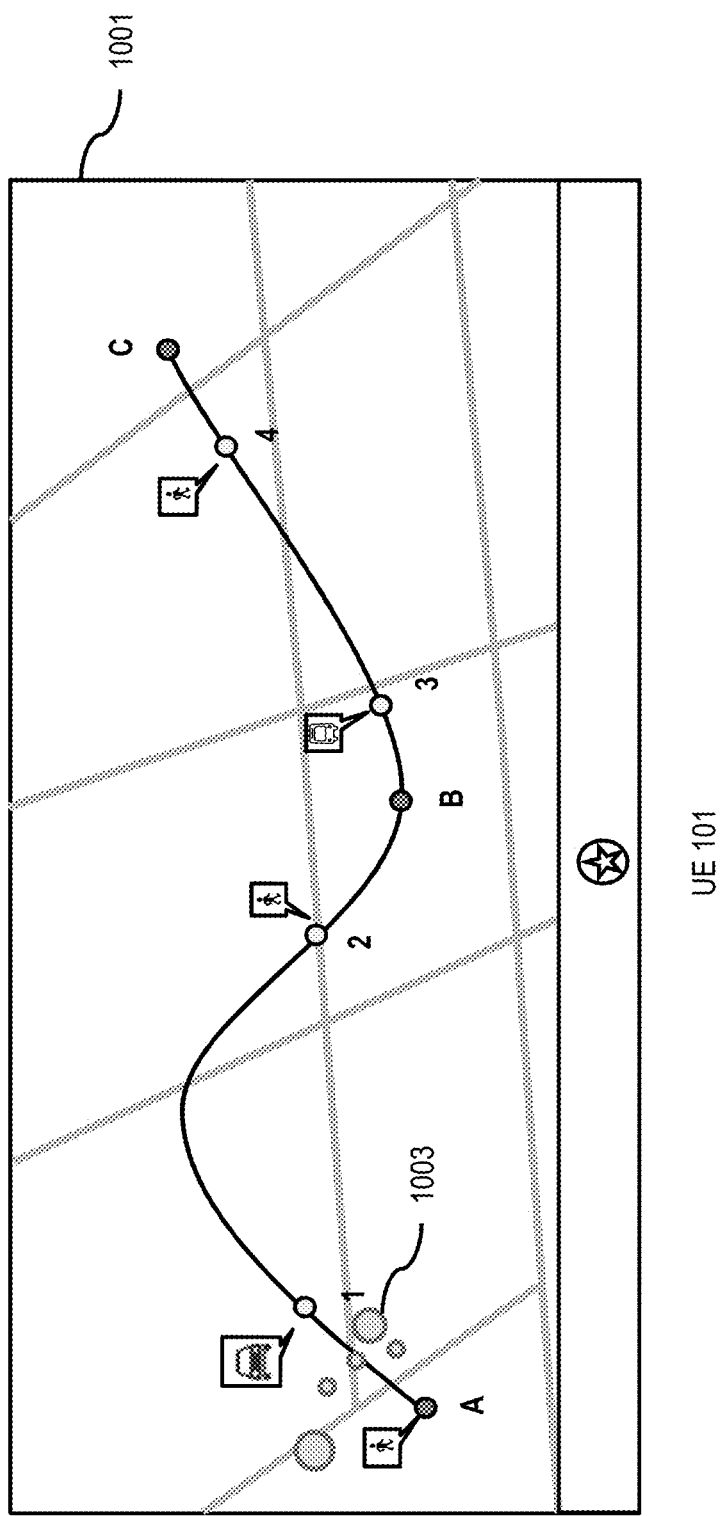

As shown in FIG. 10B, one or more search results 1003 (e.g., restaurants) are presented on the user interface 1001 based, at least in part, on the distance, the ratings, accessibility via certain modes of transport, or a combination thereof for the segment A to 1 of a multi-modal route. For example, search for results between A and 1 is limited to 1 kilometer from the route, but also a highly rated restaurant as far as 2 kilometers away may be included in the search results as a public transport route is found from the user's location A to the waypoint 1. In one scenario, the restaurant which is further away has a higher rating than any of the restaurants within the 1 kilometer distance of the A to 1 route.

Figure 10C:
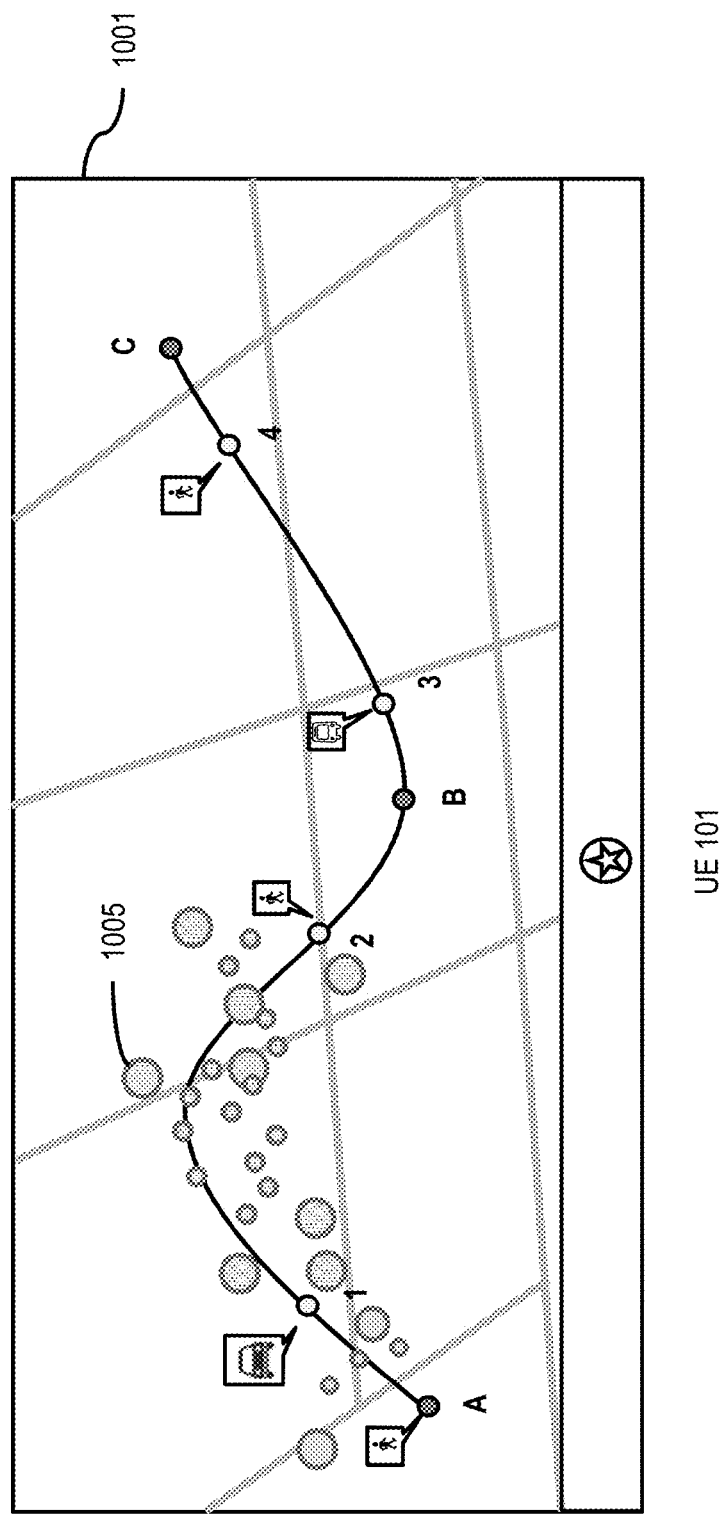

As shown in FIG. 10C, one or more search results 1005 are presented on the user interface 1001 based, at least in part, on the distance, the ratings, accessibility via certain modes of transport, or a combination thereof for segment 1 to 2 of a multi-modal route. For example, search results between the waypoints 1 and 2 which are within 1 km routing distance from the route A to C are presented. Further, search results that are further away from the route A to C, but with high ratings are considered when they are reachable by car within a certain time threshold (e.g., 5 minutes), and the user can return to route A to C within the time threshold.

Figure 10D:
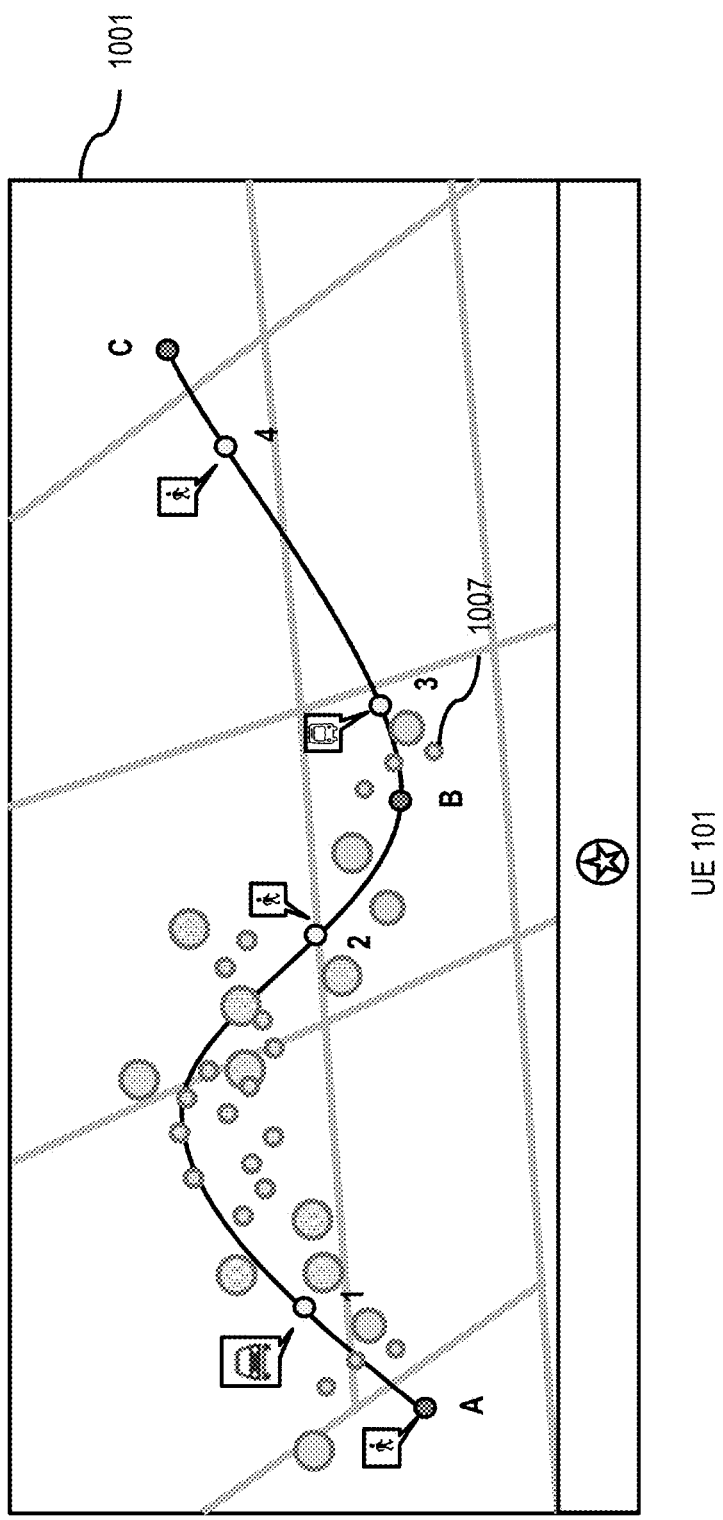

As depicted in FIG. 10D, one or more search results 1007 are presented on the user interface 1001 based, at least in part, on the distance, the ratings, accessibility via certain modes of transport, or a combination thereof for the segments 2 to B to 3 of a multi-modal route. As displayed, the mode of transport for this segment is a pedestrian mode, so the user can walk from the point 2 to 3. In this exemplary scenario, search results (e.g., restaurants) with high ratings near 2 and B are prioritized, together with the search results near the route A to C. Further, since the segment 1 to 2 was a drive segment, the search is extended to potential locations that are reachable by the same car, when the restaurants further away have higher ratings than the ones close to the route. In addition, the search result is extended to the segment B to 3. By way of example, since user is less likely to use car after B and the segment 3 to 4 is a public transit segment, more priority may be set on the search results nearby the waypoint 3 and the search results that are reachable by public transit.

Figure 10E:
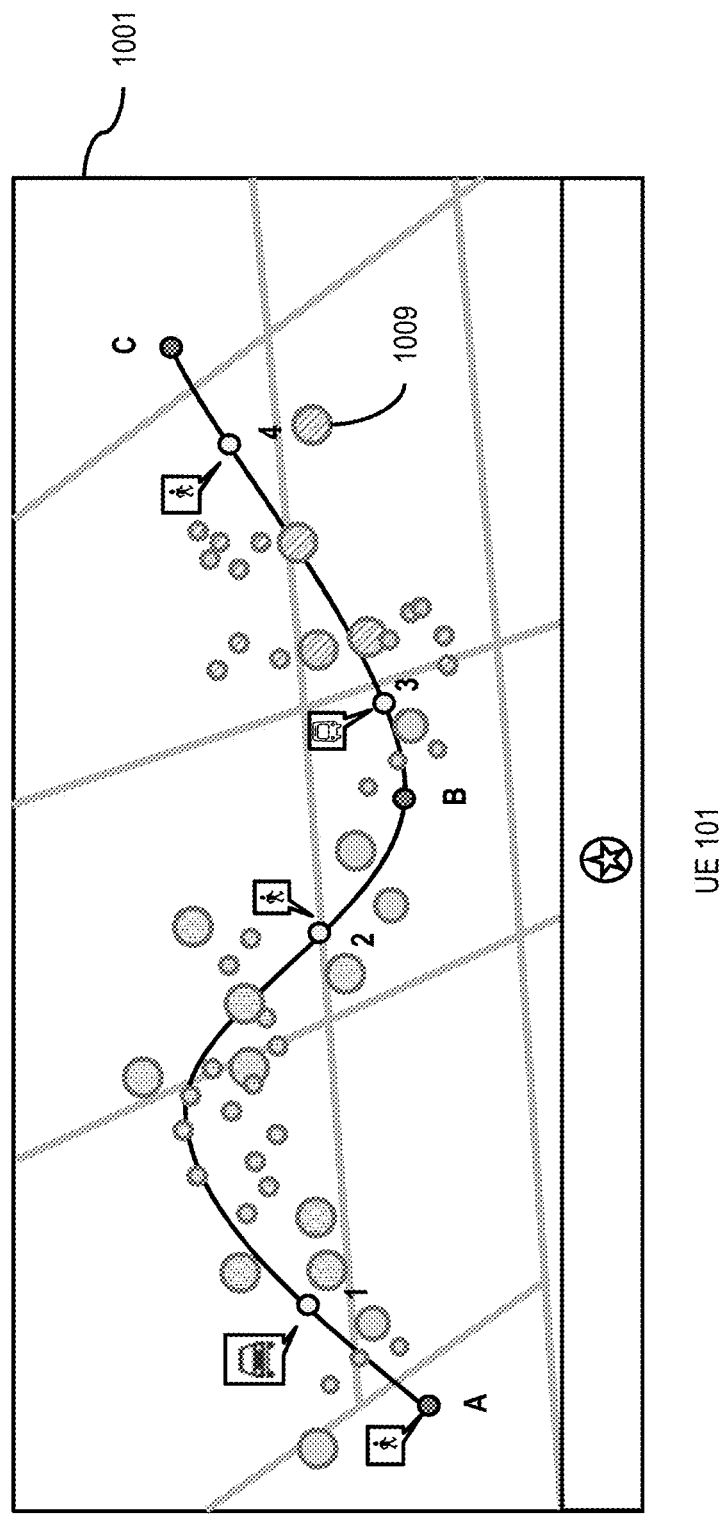

As shown in FIG. 10E, one or more search results 1009 are presented on the user interface 1001 based, at least in part, on the distance, the ratings, accessibility via certain modes of transport, or a combination thereof for the segment 3 to 4 of a multi-modal route. As noted previously, the segment 3 to 4 includes a public transit mode. Consequently, search results nearby the waypoint 3 and the waypoint 4 are prioritized. For example, the waypoints 3 and 4 may be public bus stops. Since the user is less likely to use the car after waypoint B, more priority may be set on the restaurants close to waypoint 2 and restaurants reachable by public transit. Therefore, highly rated search results (e.g., restaurants) along the segment 3 to 4 are considered, as the user can exit the public transit to access the restaurant and come back once done. Further, crossing public transit may be considered to prioritize the search results.

Figure 10F:
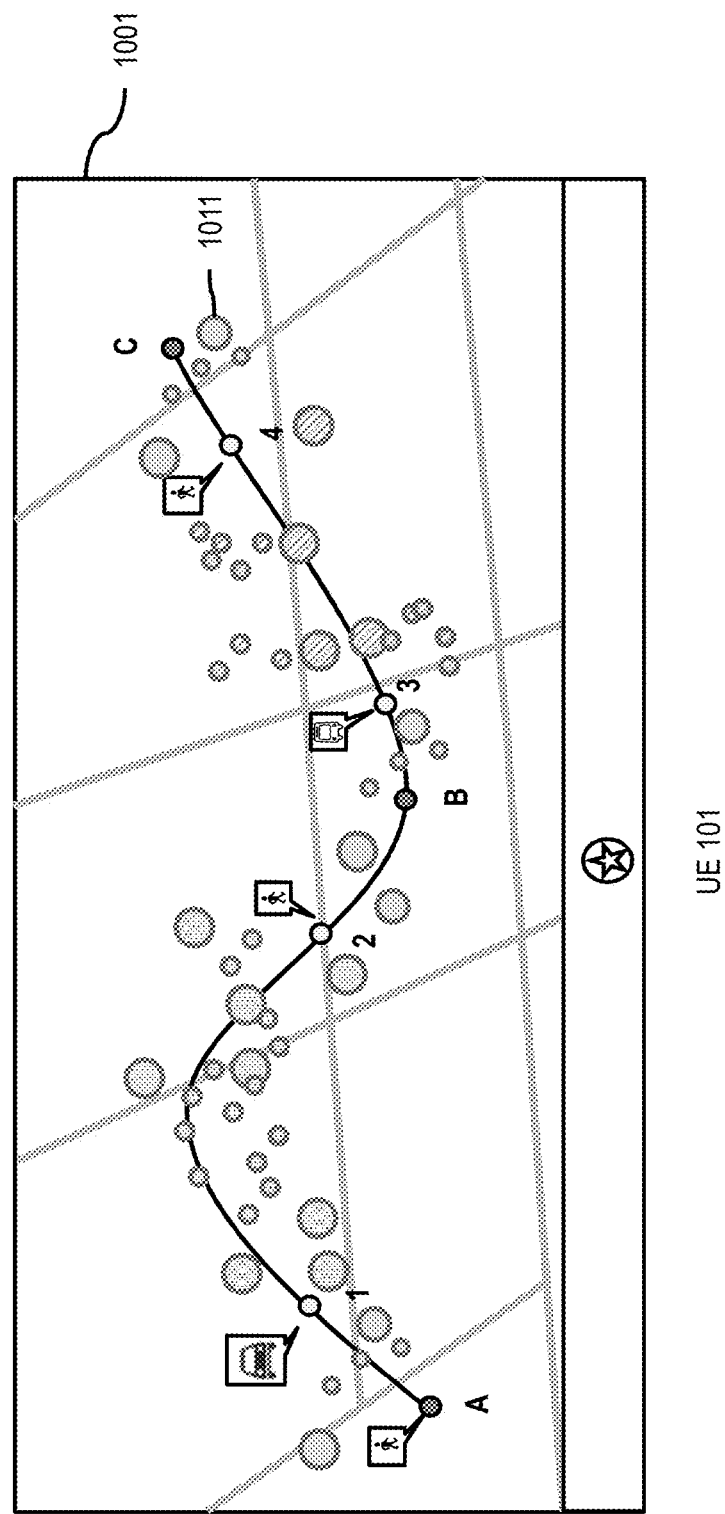

As depicted in FIG. 10F, one or more search results 1011 are presented on the user interface 1001 based on the pedestrian mode of transport for the segment 4 to C. In this scenario, highly rated search results (e.g., restaurants) along the route A to C, that are near waypoint 4 and the destination C are prioritized. For instance, since C is the destination, the search is not extended beyond C more than a certain distance threshold (e.g., 300 meters). By way of example, the user is unlikely to travel further away for a restaurant than what is the current and/or remaining distance to the destination. Therefore, if waypoint 4 is 1000 meters from the destination C, the search along the segment 4 to C is limited to 350 meters (i.e., almost half the distance between 4 and C).

Figure 10G:
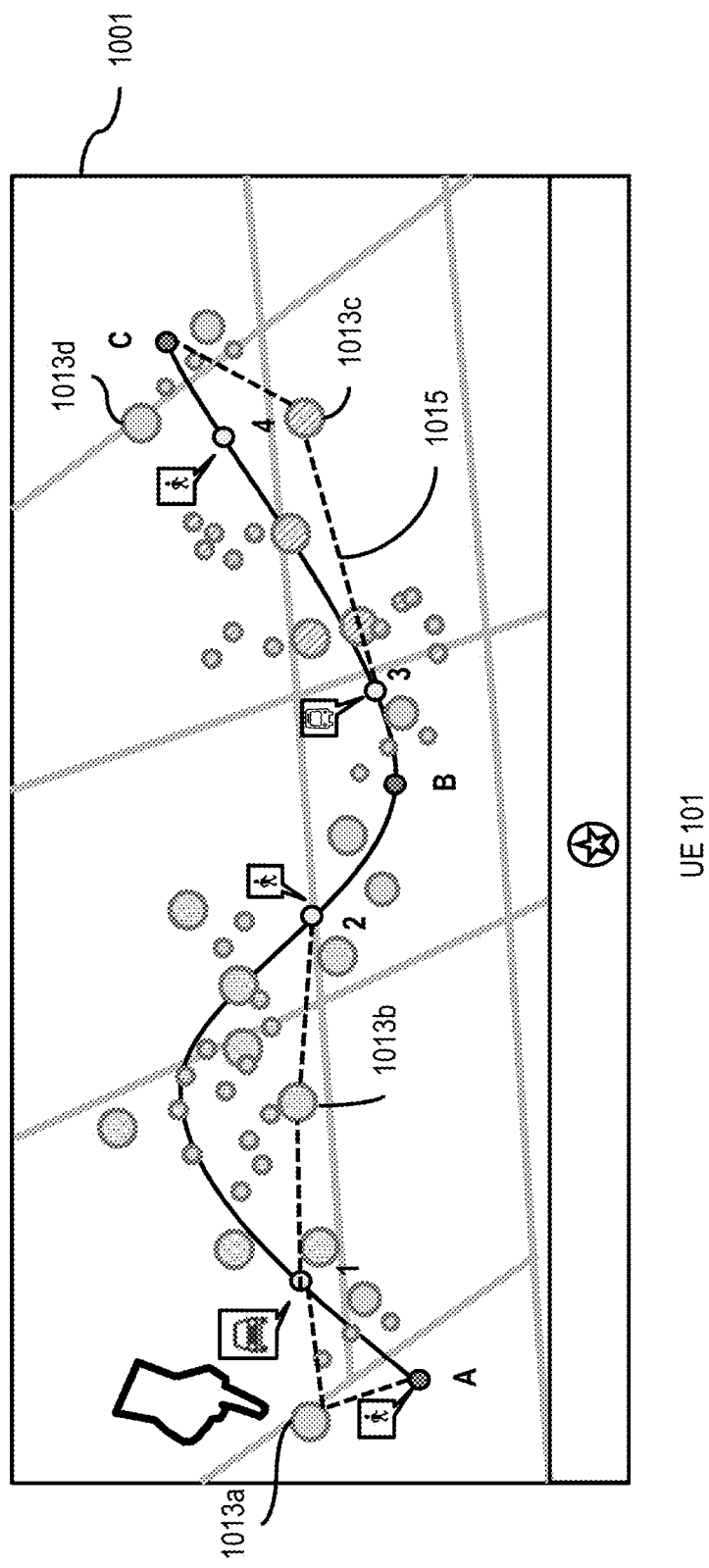

As shown in FIG. 10G, the route A to C is considered as a whole to search and present the POIs on the UE 101. In one embodiment, the navigation platform 109 considers the route as a whole when a user exits the route to visit a restaurant. The location of the restaurant the user is visiting is added to the route as a waypoint. In such manner, the navigation platform 109 provides the user with best available route to the restaurant, and from the restaurant towards the next waypoint or the destination. As depicted, if the user selects search results 1013*a*, then the locations of the search results are incorporated as waypoints in the route A to C. In one embodiment, the search result 1013*b* is incorporated in the route A to C when the user exits the waypoint 1. In another embodiment, the search results 1013*c* is prioritized based on the change in the location of the waypoints from the route A to C that would result if the one or more search results were to be incorporated into the at least one route A to C. For example, the change in location of waypoints resulting from selection of the search results 1013*c* and 1014*d* may be calculated to prioritize the search result 1013*c*.

The processes described herein for determining relevant point of interest for a user on a multi-modal route may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
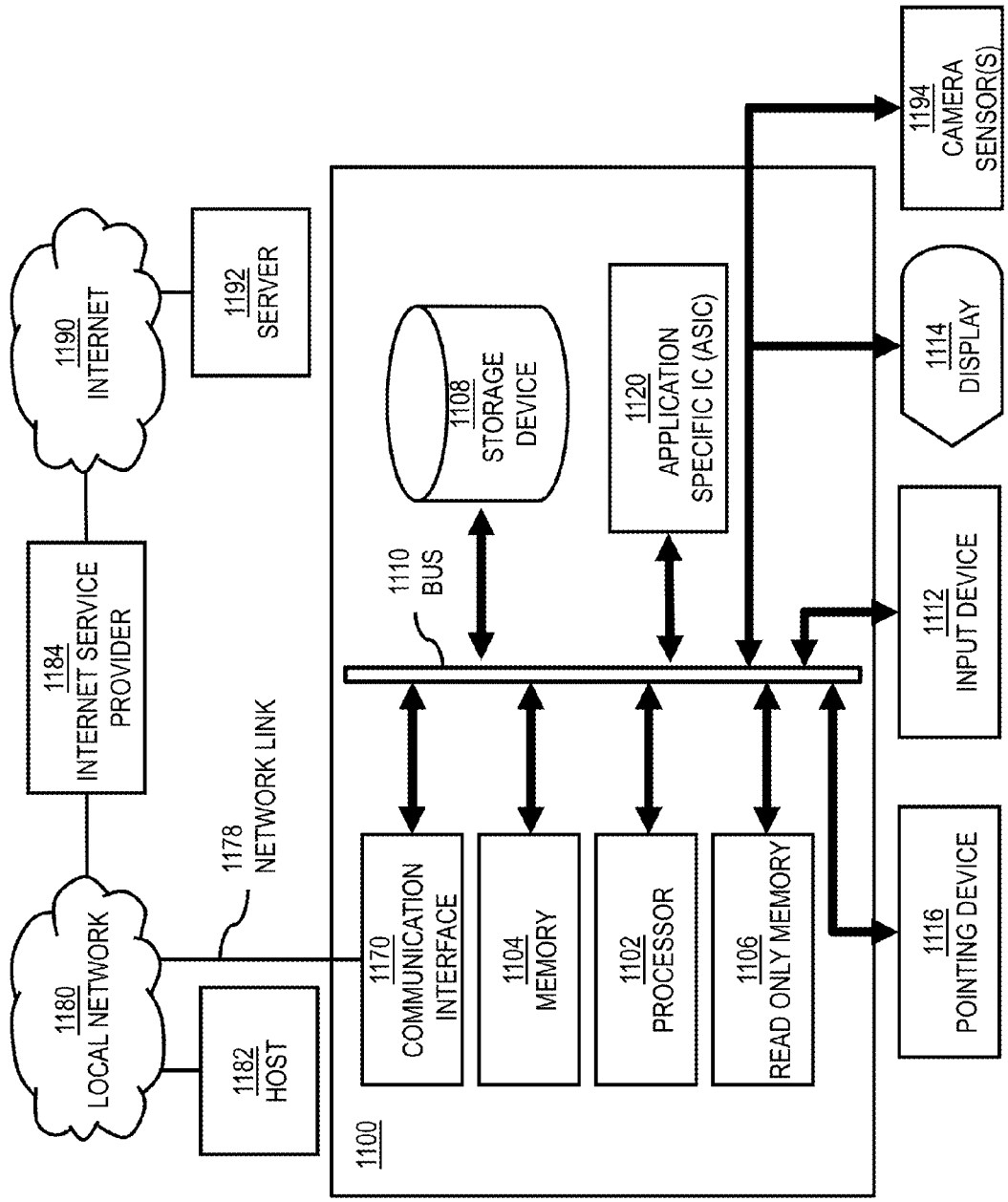
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to determine relevant point of interest for a user on a multi-modal route as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of determining relevant point of interest for a user on a multi-modal route.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to determining relevant point of interest for a user on a multi-modal route. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1100 also includes a memory 1104 coupled to bus 1110. The memory 1104, such as a random access memory (RAM) or any other dynamic storage device, stores information including processor instructions for determining relevant point of interest for a user on a multi-modal route. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for determining relevant point of interest for a user on a multi-modal route, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114, and one or more camera sensors 1194 for capturing, recording and causing to store one or more still and/or moving images (e.g., videos, movies, etc.) which also may comprise audio recordings. In some embodiments, for example, in embodiments in which the computer system 1100 performs all functions automatically without human input, one or more of external input device 1112, display device 1114 and pointing device 1116 may be omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 107 for determining relevant point of interest for a user on a multi-modal route to the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to determine relevant point of interest for a user on a multi-modal route as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of determining relevant point of interest for a user on a multi-modal route.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to determine relevant point of interest for a user on a multi-modal route. The memory 1205 also stores the data associated with or generated by the execution of the inventive steps.

Figure 13:
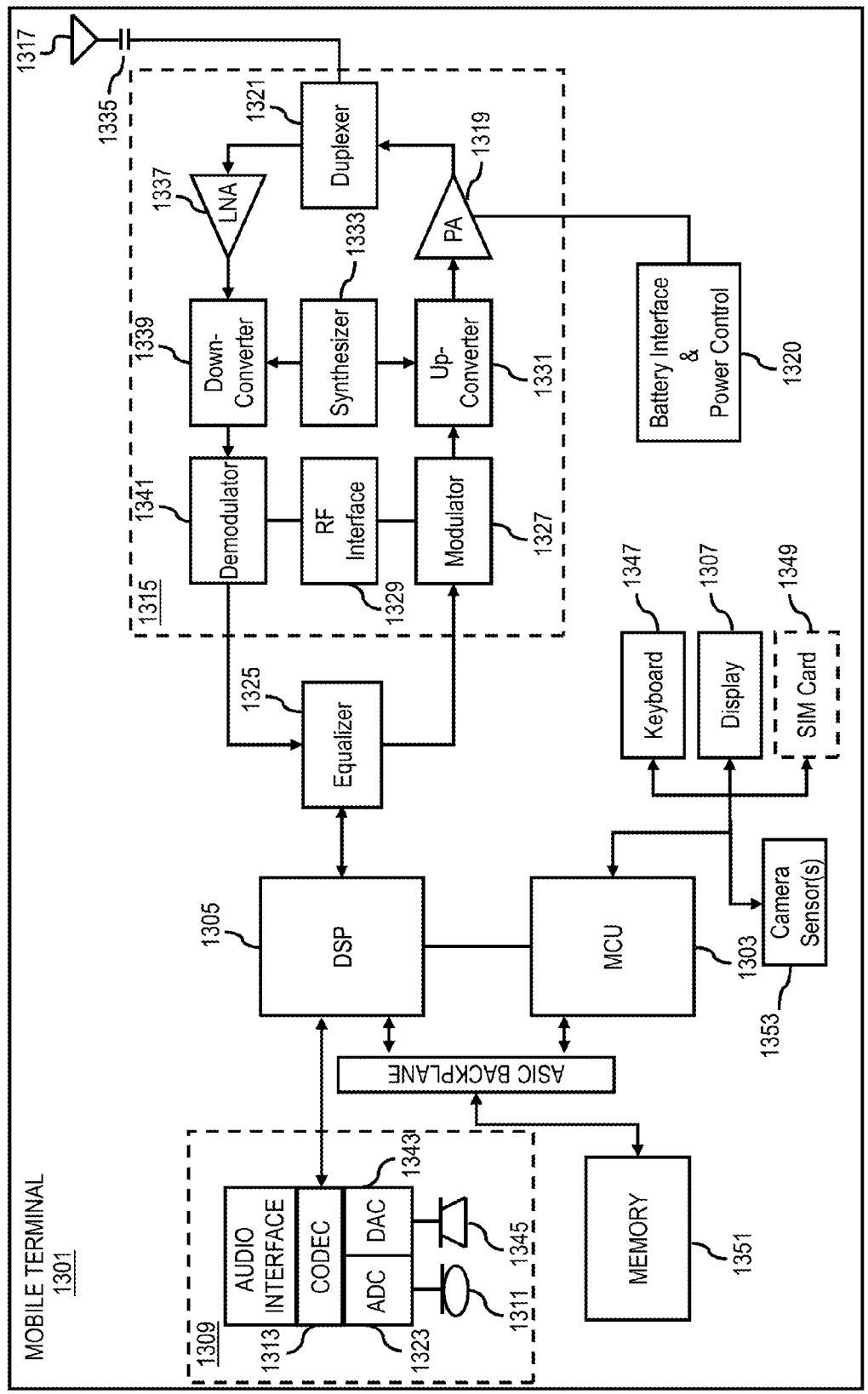
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of determining relevant point of interest for a user on a multi-modal route. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a base-band integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of determining relevant point of interest for a user on a multi-modal route. The display 1307 includes display circuitry configured to display at least a portion of a user interface of the mobile terminal (e.g., mobile telephone). Additionally, the display 1307 and display circuitry are configured to facilitate user control of at least some functions of the mobile terminal An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to determine relevant point of interest for a user on a multi-modal route. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

Further, one or more camera sensors 1353 may be incorporated onto the mobile station 1301 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:
1. A method comprising:
receiving a request, receiving, by a processor of a navigation platform, a request from a user interface at least one multi-modal route that has been generated by the navigation platform, wherein the multi-modal route includes a plurality of segments that employ a plurality of modes of transport, and wherein the multi-modal route further includes a plurality of transition waypoints for transitioning between the plurality of segments;
determining, by the processor one or more search results for the at least one search;
causing, by the processor, a prioritization of the one or more search results by determining at least one change in one or more locations of the plurality of transition waypoints that would result if the one or more search results were to be incorporated into the at least one multi-modal route; and
presenting, by the processor, the one or more search results on the user interface based on the prioritization.
2. The method of claim 1, further comprising:
determining search priority information, search distance information, or a combination thereof independently for the plurality of segments based, at least in part, on which of the plurality of modes of transport is used during a respective one of the plurality of segments, wherein the one or more search results are determined based, at least in part, on the search priority information, the search distance information, or a combination thereof.

3. The method of claim 1, further comprising:
determining reachability information for the one or more search results based, at least in part, on the at least one change in the one or more locations of the plurality of transition waypoints, wherein the reachability information indicates a degree to which the one or more search results are reachable by a user using a respective one of the plurality of modes of transport,
wherein the prioritization of the one or more search results is further based, at least in part, on the reachability information.

4. The method of claim 1, wherein the prioritization of the one or more search results is further based, at least in part, on proximity information, type information, ratings information, user history information, or a combination thereof.

5. The method of claim 4, further comprising:
receiving an input for specifying at least one target proximity, at least one target type, at least one target rating, at least one target user history, or a combination thereof; and
causing, at least in part, a calculation of the at least one change in the one or more locations of the plurality of transition waypoints to select the one or more search results that meet the at least one target proximity, the at least one target type, the at least one target rating, the at least one target user history, or a combination thereof based, at least in part, on the proximity information, the type information, the ratings information, the user history information, or a combination thereof.

6. The method of claim 1, further comprising:
receiving an input for specifying a selection of the one or more search results; and
causing, at least in part, an incorporation of the selected one or more search results into the at least one multi-modal route by incorporating the at least one change in the one or more locations of the plurality of transition waypoints.

7. The method of claim 1, further comprising:
causing, at least in part, a recommendation of one or more new segments, one or more new modes of transport, or a combination thereof based, at least in part, on the one or more search results.

8. The method of claim 1, further comprising:
causing, at least in part, a designation of a maximum range for at least one change in the one or more locations of the plurality of transition waypoints.

9. The method of claim 1, wherein the one or more modes of transport include, at least in part, a pedestrian mode, a driving mode, a public transit mode, or a combination thereof.

10. A method of claim 1, further comprising:
designating a maximum range for the at least one change in the one or more locations of the plurality of transition waypoints,
wherein the one or more search results are further determined based on the maximum range.

11. An apparatus comprising:
at least one processor; and
at least one memory including computer program code for one or more programs,
the at least one memory and the computer program code configured to, with the at least one processor, cause the apparatus to perform at least the following,
receive a request from a user interface to perform at least one search for one or more points of interest along at least one multi-modal route that has been generated by a navigation platform, wherein the multi-modal route includes a plurality of segments that employ a plurality of modes of transport, and wherein the multi-modal route further includes a plurality of transition waypoints for transitioning between the plurality of segments;
determine one or more search results for the at least one search;
cause, a prioritization of the one or more search results by determining at least one change in one or more locations of the plurality of transition waypoints that would result if the one or more search results were to be incorporated into the at least one multi-modal route; and
present, on the user interface, the one or more search results based on the prioritization.

12. The apparatus of claim 11, wherein the apparatus is further caused to:
determine search priority information, search distance information, or a combination thereof independently for the plurality of segments based, at least in part, on which of the plurality of modes of transport is used during a respective one of the plurality of segments,
wherein the one or more search results are determined based, at least in part, on the search priority information, the search distance information, or a combination thereof.

13. The apparatus of claim 11, wherein the apparatus is further caused to:
determine reachability information for the one or more search results based, at least in part, on the at least one change in the one or more locations of the plurality of transition waypoints, wherein the reachability information indicates a degree to which the one or more search results are reachable by a user using a respective one of the plurality of modes of transport,
wherein the prioritization of the one or more search results is further based, at least in part, on the reachability information.

14. The apparatus of claim 11, wherein the prioritization of the one or more search results is further based, at least in part, on proximity information, type information, ratings information, user history information, or a combination thereof.

15. The apparatus of claim 14, wherein the apparatus is further caused to:
receive an input for specifying at least one target proximity, at least one target type, at least one target rating, at least one target user history, or a combination thereof; and
cause, at least in part, a calculation of the at least one change in the one or more locations of the plurality of transition waypoints to select the one or more search results that meet the at least one target proximity, the at least one target type, the at least one target rating, the at least one target user history, or a combination thereof based, at least in part, on the proximity information, the type information, the ratings information, the user history information, or a combination thereof.

16. The apparatus of claim 11, wherein the apparatus is further caused to:
receive an input for specifying a selection of the one or more search results; and cause, at least in part, an incorporation of the selected one or more search results into the at least one multi-modal route by incorporating the at least one change in the one or more locations of the plurality of transition waypoints.

17. The apparatus of claim 11, wherein the apparatus is further caused to:

cause, at least in part, a recommendation of one or more new segments, one or more new modes of transport, or a combination thereof based, at least in part, on the one or more search results.

18. A non-transitory computer-readable storage medium carrying one or more sequences of one or more instructions which, when executed by one or more processors, cause an apparatus to at least perform the following steps:

receiving a request, receiving, by a processor of a navigation platform, a request from a user interface at least one multi-modal route that has been generated by the navigation platform, wherein the multi-modal route includes a plurality of segments that employ a plurality of modes of transport, and wherein the multi-modal route further includes a plurality of transition waypoints for transitioning between the plurality of segments;

determining, by the processor one or more search results for the at least one search;

causing, by the processor, a prioritization of the one or more search results by determining at least one change in one or more locations of the plurality of transition waypoints that would result if the one or more search results were to be incorporated into the at least one multi-modal route; and presenting, by the processor, the one or more search results on the user interface based on the prioritization.

19. The computer-readable storage medium of claim 18, wherein the apparatus is further caused to perform:

determining search priority information, search distance information, or a combination thereof independently for the plurality of segments based, at least in part, on which of the plurality of modes of transport is used during a respective one of the plurality of segments, wherein the one or more search results are determined based, at least in part, on the search priority information, the search distance information, or a combination thereof.

20. The computer-readable storage medium of claim 18, wherein the apparatus is further caused to perform:

determining reachability information for the one or more search results based, at least in part, on the at least one change in the one or more locations of the plurality of transition waypoints, wherein the reachability information indicates a degree to which the one or more search results are reachable by a user using a respective one of the plurality of modes of transport, wherein the prioritization of the one or more search results is further based, at least in part, on the reachability information.

* * * * *